US008667282B2

(12) United States Patent
Hamada

(10) Patent No.: US 8,667,282 B2
(45) Date of Patent: *Mar. 4, 2014

(54) INFORMATION PROCESSING DEVICE, COMPUTER PROGRAM, AND INFORMATION PROCESSING SYSTEM

(71) Applicant: Sony Corporation, Tokyo (JP)

(72) Inventor: Hiroaki Hamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,206

(22) Filed: Oct. 8, 2012

(65) Prior Publication Data

US 2013/0198515 A1   Aug. 1, 2013

Related U.S. Application Data

(63) Continuation of application No. 12/502,811, filed on Jul. 14, 2009, now Pat. No. 8,321,674.

(30) Foreign Application Priority Data

Jul. 14, 2008 (JP) ................................. 2008-183017
Mar. 27, 2009 (JP) ................................. 2009-078806

(51) Int. Cl.
*H04L 9/00* (2006.01)
(52) U.S. Cl.
USPC ........................... 713/169; 713/168; 380/262
(58) Field of Classification Search
None
See application file for complete search history.

(56) References Cited

U.S. PATENT DOCUMENTS

| 5,963,646 | A | 10/1999 | Fielder et al. |
| 6,769,060 | B1 | 7/2004 | Dent et al. |
| 6,879,690 | B2 | 4/2005 | Faccin et al. |
| 7,451,307 | B2 * | 11/2008 | Matsushima ................. 713/156 |
| 7,617,402 | B2 | 11/2009 | Shibata et al. |
| 8,533,474 | B2 * | 9/2013 | Schneider ..................... 713/171 |
| 2004/0250073 | A1 * | 12/2004 | Cukier et al. ................. 713/171 |

FOREIGN PATENT DOCUMENTS

| JP | 01-279650 | 11/1989 |
| JP | HEI 02-044389 | 2/1990 |
| JP | HEI 05-075598 | 3/1993 |
| JP | 09-107350 | 4/1997 |
| JP | HEI 10-210023 | 8/1998 |
| JP | 10-233771 | 9/1998 |
| JP | 2002-508892 | 3/2002 |
| JP | 2002-314532 | 10/2002 |

(Continued)

OTHER PUBLICATIONS

Menezes et al., Handbook of Applied Cryptography, 1997, CRC Press, pp. 497-504.*

(Continued)

*Primary Examiner* — Minh Dinh
(74) *Attorney, Agent, or Firm* — K&L Gates LLP

(57) ABSTRACT

An information processing device including a receiving unit that receives a first random number from another information processing device; a generating unit that generates a second random number; a time-variant-key generating unit that generates a time variant key for encryption according to the second random number; an encrypting unit that encrypts the first random number with the time variant key; and a transmitting unit that transmits the first random number encrypted by the time variant key and the second random number to the other information processing device.

17 Claims, 24 Drawing Sheets

(56) References Cited

FOREIGN PATENT DOCUMENTS

JP        2003-234734    8/2003
JP        2005-210271    8/2005
JP           3897177     1/2007

OTHER PUBLICATIONS

Japanese Office Action issued on Jun. 6, 2010 for corresponding Japanese Patent Application JP2009-078806.

Nozaki et al., "Countermeasure Technique against Packaging Attack of Encryption Module", Toshiba Review, Japan, [online] Jul. 2009, pp. 28-31 vol. 64, No. 7 [retrieved from the Internet on Jun. 3, 2001] URL, http://www.toshiba.co.jp/tech/review/2009/07/64 07pdf/a08.pdf.

Japanese Office Action issued Feb. 14, 2013 for corresponding Japanese Appln. No. 2010-178632.

* cited by examiner

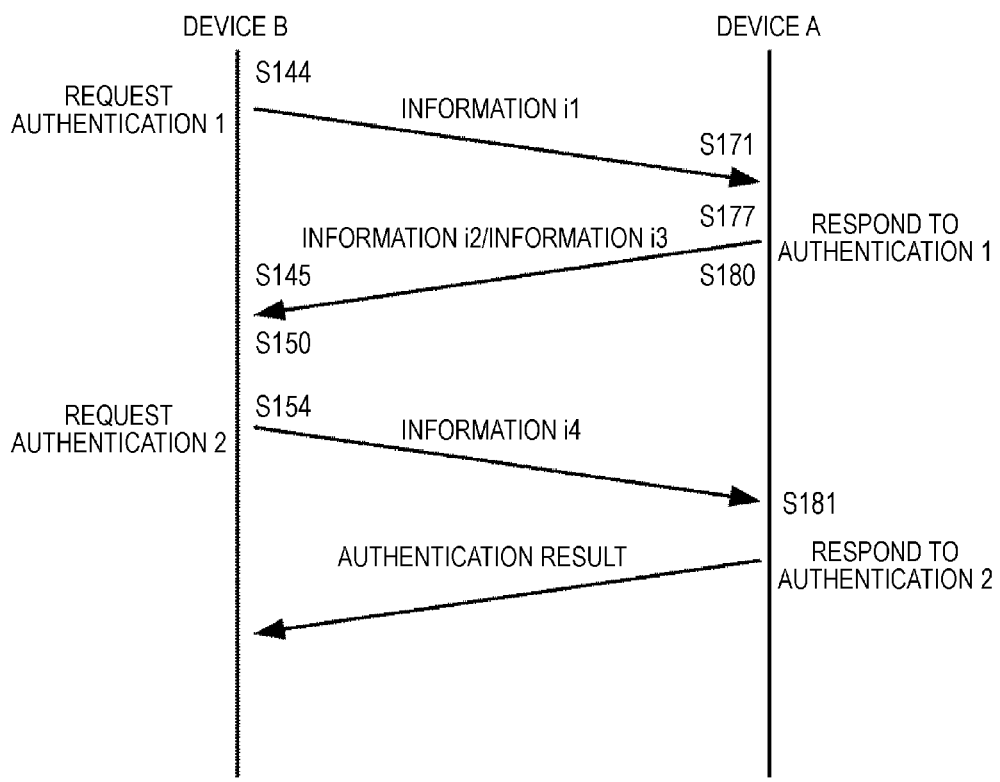
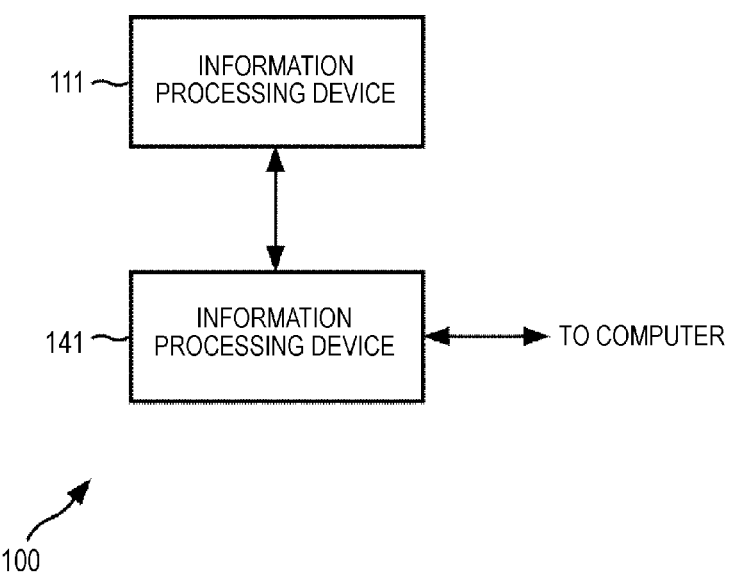

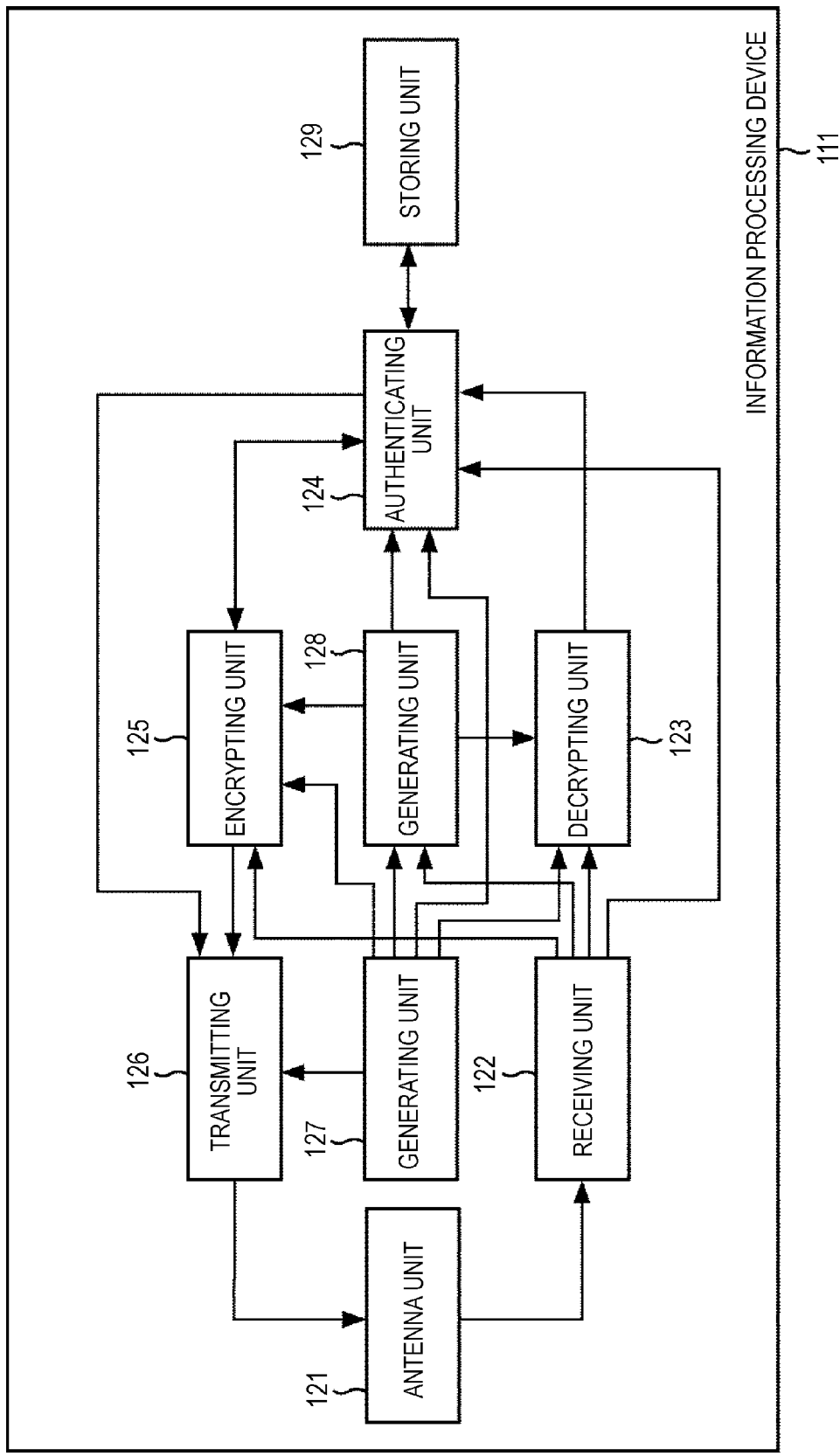

INFORMATION PROCESSING DEVICE, COMPUTER PROGRAM, AND INFORMATION PROCESSING SYSTEM

CROSS REFERENCES TO RELATED APPLICATIONS

The present application is a continuation of U.S. patent application Ser. No. 12/502,811, filed on Jul. 14, 2009, which claims priority to Japanese Priority Patent Applications JP 2008-183017 and JP 2009-078806 filed in the Japan Patent Office on Jul. 14, 2008 and Mar. 27, 2009, respectively, the entire contents of which is hereby incorporated by reference.

BACKGROUND

The present application relates to an information processing device, a computer program, and an information processing system, and, more particularly to an information processing device, a computer program, and an information processing system that enable a user to prevent illegal access.

Recently, IC cards are widely spread and used for, for example, payment for shopping in stores by a large number of users. To prevent use of illegal IC cards, authentication processing is necessary between an IC card and a reader writer when the IC card is used. A unidirectional authentication method between such two devices is specified as Two pass authentication in ISO/IEC 9789-2 5.1.2. FIG. 1 is a simplified flowchart of the authentication method.

Steps S21 to S24 represent processing by a device A and steps S1 to S8 represent processing by a device B that authenticates the device A.

In step S1, the device B generates a random number rb. In step S2, the device B transmits the random number rb to the device A.

In step S21, the device A receives the random number rb transmitted from the device B. In step S22, the device A generates a key Kab. In step S23, the device A encrypts, with the key Kab, the random number rb received from the device B. Specifically, the device A calculates the following formula to generate information Token ab. In the formula, eKab(rb) indicates that the random number rb is encrypted by the key Kab.

$$\text{Token } ab = eKab(rb) \qquad \text{Formula 1}$$

In step S24, the device A transmits the information Token ab generated in step S23 to the device B.

In step S3, the device B receives the information Token ab transmitted from the device A. In step S4, the device B generates a key Kab. In step S5, the device B decrypts the received information Token ab with the key Kab. Consequently, a random number rb is obtained.

In step S6, the device B determines whether a decryption result and the random number rb coincide with each other. Specifically, the device B determines whether the random number rb generated in step S1 and the random number rb obtained by decrypting the information Token ab received from the device A in step S5 coincide with each other. The key Kab kept by the device A is a secret key allocated to only a regular device. Since the device A keeps the key Kab, the device A is a regular device.

When the decryption result and the random number rb do not coincide with each other, in step S7, the device B executes authentication failure processing for the device A. On the other hand, when the decryption result and the random number rb coincide with each other, in step S8, the device B executes authentication success processing for the device A.

A bidirectional authentication method between two devices is specified as Three pass authentication in ISO/IEC 9798-2.5.2.2. FIG. 2 is a simplified flowchart of the authentication method.

In step S31, the device B generates the random number rb. In step S32, the device B transmits the random number rb to the device A.

In step S51, the device A receives the random number rb transmitted from the device B. In step S52, the device A generates a random number ra and the key Kab. In step S53, the device A encrypts the random number ra and the random number rb with the key Kab. Specifically, the device A encrypts, according to the following formula, a combination of the random number ra generated in step S52 and the random number rb received from the device B. In the formula, (ra∥rb) represents the combination of the random number ra and the random number rb.

$$\text{Token } ab = eKab(ra\|rb) \qquad \text{Formula 2}$$

In step S54, the device A transmits information Token ab calculated by Formula 2 to the device B.

In step S33, the device B receives the information Token ab transmitted from the device A. In step S34, the device B generates the key Kab.

In step S35, the device B decrypts the information Token ab with the key Kab. As explained above, the information Token ab is information obtained by the device A encrypting the combination (ra∥rb) of the random number ra and the random number rb with the key Kab in step S53. Therefore, the combination (ra∥rb) is obtained by this decryption processing.

In step S36, the device B determines whether a decryption result and the random number rb coincide with each other. Specifically, in this case, the device B extracts only the random number rb of the combination (ra∥rb) obtained as the decryption result, sets the random number rb as a comparison target, and compares the random number rb with the random number rb generated in step S31.

When the device A is a regular information processing device, since the device A keeps a correct fixed secret key Kab, the two random numbers rb coincide with each other.

However, when the device A is an illegal device, the device A does not keep the correct key Kab. As a result, the two random numbers rb do not coincide with each other. Therefore, in this case, in step S37, the device B executes authentication failure processing for the device A.

When the two random numbers rb coincide with each other, in step S38, the device B executes authentication success processing for the device A.

Further, in order to cause the device A to authenticate the device B, in step S39, the device B encrypts the random number rb and the random number ra with the key Kab. Specifically, the device B encrypts, according to the following formula, the combination of the random number rb generated in step S31 and the random number ra received from the device A to generate information Token ba.

$$\text{Token } ba = eKab(rb\|ra) \qquad \text{Formula 3}$$

In step S40, the device B transmits the information Token ba to the device A.

In step S55, the device A receives the information Token ba transmitted from the device B. In step S56, the device A decrypts the information Token ba with the key Kab. The information Token ba is information obtained by the device B encrypting the combination (rb∥ra) of the random number rb and the random number ra with the key Kab in step S39. Therefore, the combination (rb∥ra) is obtained by this decryption processing.

In step S57, the device A determines whether the random numbers rb and ra as the decryption result and the random number rb received from the device A in step S51 and the random number ra generated in step S52 coincide with each other.

When the device B is a regular device, the device B keeps a secret key Kab same as that of the device A. Therefore, the two random numbers ra coincide with each other and the two random numbers rb also coincide with each other.

However, when the device B is an illegal device, the device B does not keep a secret key Kab same as that of the device A. As a result, in this case, in step S58, the device A executes authentication failure processing for the device B.

When the random numbers ra and rb coincide with each other, in step S59, the device A executes authentication success processing for the device B.

In the example shown in FIG. 2, in steps S36 and S37, the random numbers ra and rb are set as the comparison targets. An example of processing performed when the comparison targets are random numbers as encrypted is shown in FIG. 3.

Processing by the device B in steps S61 to S70 in the example shown in FIG. 3 is basically the same as the processing by the device B in steps S31 to S40 in FIG. 2. However, processing in steps S63, S65, and S66 in FIG. 3 is different from the processing in steps S33, S35, and S36 in FIG. 2.

Processing by the device A in steps S81 to S89 in FIG. 3 is basically the same as the processing by the device A in steps S51 to S59 in FIG. 2. However, processing in steps S84, S86, and S87 in FIG. 3 is different from the processing in steps S54, S56, and S57 in FIG. 2.

In the case of the example shown in FIG. 3, in step S84, the device A transmits not only the information Token ab but also the random number ra.

In step S63, the device B receives not only the information Token ab but also the random number ra. In step S64, the device B generates a key Kab. In step S65, the device B encrypts a combination of the random number ra and the random number rb with the key Kab to generate information Token ab. The following formula is calculated:

$$\text{Token } ab = eKab(ra \| rb) \quad \text{Formula 4}$$

In step S66, the device B determines whether an encryption result obtained in step S65 and the information Token ab received from the device A in step S63 coincide with each other. When the information Token ab calculated by Formula 4 and the information Token ab received from the device A do not coincide with each other, in step S67, the device B executes authentication failure processing for the device A. On the other hand, when the information Token ab calculated by Formula 4 and the information Token ab received from the device A coincide with each other, in step S68, the device B executes authentication success processing for the device A.

Further, in order to cause the device A to authenticate the device B, in step S69, the device B encrypts a combination of the random number rb and the random number ra with the key Kab. Specifically, the device B encrypts, according to the following formula, a combination of the random number generated in step S61 and the random number ra received from the device A.

$$\text{Token } ba = eKab)(rb \| ra) \quad \text{Formula 5}$$

In step S70, the device B transmits information Token ba calculated by Formula 5 to the device A.

In step S85, the device A receives the information Token ba transmitted from the device B. In step S86, the device A performs processing for encrypting, with the key Kab, a combination of the random number rb received from the device B in step S81 and the random number ra transmitted to the device B in step S84. Specifically, the device A calculates the following formula:

$$\text{Token } ba = eKab(rb \| ra) \quad \text{Formula 6}$$

In step S87, the device A determines whether an encryption result in step S86 (i.e., information Token ba calculated in step S86) and the information Token ba received in step S85 coincide with each other. When the two kinds of information Token ba do not coincide with each other, in step S88, the device A executes authentication failure processing for the device B.

When the two kinds of information Token ba coincide with each other, in step S89, the device A executes authentication success processing for the device B.

Other processing is the same as the processing shown in FIG. 2.

The applicant also makes a proposal concerning a bidirectional authentication method (e.g., Japanese Patent No. 3897177). FIGS. 4 and 5 are simplified flowcharts of the authentication method.

In step S141, the device B generates a random number P. In step S142, the device B generates a key Ka. In step S143, the device B encrypts the random number P with the key Ka to generate information i1. In step S144, the device B transmits the information i1 to the device A.

In step S171, the device A receives the information i1 from the device B. In step S172, the device A generates a key Ka. In step S173, the device A decrypts the information i1 with the key Ka. Consequently, in step S174, the device A acquires a random number P.

In step S175, the device A generates a key Kb. In step S176, the device A encrypts the random number P with the key Kb to generate information i2. In step S177, the device A transmits the information i2 to the device B.

In step S145, the device B receives the information i2 transmitted from the device A. In step S146, the device B generates a key Kb. In step S147, the device B decrypts the information i2 with the key Kb. Consequently, in step S148, the device B acquires a random number P.

In step S149, the device B checks consistency of the random numbers P. Specifically, the device B determines whether the random number P generated in step S141, encrypted, and transmitted to the device A in step S144 and the random number P obtained by decrypting the information i2, which is received from the device A, in step S147 coincide with each other. The key Ka and the key Kb are allocated to only the regular device A. Therefore, when the two random numbers P coincide with each other, the device B authenticates the device A as a regular device.

Similarly, the device A performs processing for authenticating the device B.

In step S178, the device A generates a random number Q. In step S179, the device A encrypts the random number Q with the key Kb to generate information i3. The key Kb is generated in step S175. In step S180, the device A transmits the information i3 to the device B.

In step S150, the device B receives the information i3 transmitted from the device A. In step S151, the device decrypts the information i3 with the key Kb. The key Kb is generated in step S146. Consequently, in step S152, the device B acquires a random number Q.

In step S153, the device B encrypts the random number Q with the key Ka to generate information i4. The key Ka is generated in step S142. In step S154, the device B transmits the information i4 to the device A.

In step S181, the device A receives the information i4 transmitted from the device B. In step S182, the device A decrypts the information i4 with the key Ka. The key Ka is generated in step S172. Consequently, in step S183, the device A acquires a random number Q.

In step S184, the device A checks consistency of the random numbers Q. Specifically, the device A determines whether the random number Q generated in step S178, encrypted, and transmitted to the device B in step S180 and the random number Q obtained by decrypting the information i4, which is received from the device B, in step S182 coincide with each other. The key Ka and the key kb are allocated to only the regular device B. Therefore, when the two random numbers Q coincide with each other, the device A authenticates the device B as a regular device. The device A transmits an authentication result to the device B.

SUMMARY

The exchange of the information between the two devices in the processing explained above is represented as shown in FIG. 6. In step S144, the information i1 is transmitted from the device B to the device A. In steps S177 and S180, the information i2 and the information i3 are transmitted from the device A to the device B. In step S154, the information i4 is transmitted from the device B to the device A.

In the case of the unidirectional authentication shown in FIG. 1, as in the case of the bidirectional authentication, in step S2, the random number rb is transmitted from the device B to the device A. In step S24, the information token ab is transmitted from the device A to the device B.

As a result, the device B can input the same plain text to the device A a necessary number of times and obtain a result obtained by the device A encrypting the plain text with a fixed key.

In such a case, it is likely that a user (a hacker) attempting to illegally access the device A makes DFA (Differential Fault Analysis) attack on the device B. The hacker can analyze a key kept by the device A by repeating operation for preparing an illegal device B, irradiating a laser beam on the device A while the device A is performing encryption processing, causing an error in the device with the energy of the laser beam, and obtaining a result of the processing.

Therefore, it is desirable to enable a user to prevent illegal access.

According to an embodiment, there is provided an information processing device including: a receiving unit that receives a first random number from another information processing device; a generating unit that generates a second random number; a time-variant-key generating unit that generates a time variant key for encryption according to the second random number; an encrypting unit that encrypts the first random number with the time variant key; and a transmitting unit that transmits the first random number encrypted by the time variant key and the second random number to the other information processing device.

In an embodiment, the first random number is received from the other information processing device, the second random number is generated, the time variant key for encryption is generated according to the second random number, the first random number is encrypted by the time variant key, and the first random number encrypted by the time variant key and the second random number are transmitted to the other information processing device.

According to another embodiment, there is provided an information processing device including: a generating unit that generates a first random number; a transmitting unit that transmits the first random number to another information processing device; a receiving unit that receives the first random number encrypted by a first time variant key and a second random number from the other information processing device; a time-variant-key generating unit that generates a second time variant key same as the first time variant key according to the second random number; an authentication-information generating unit that generates authentication information for authenticating the other information processing device with the second time variant key; and an authenticating unit that authenticates the other information processing device according to the authentication information.

In an embodiment, the first random number is generated, the first random number is transmitted to the other information processing device, the first random number encrypted by the first time variant key and the second random number are received from the other information processing device, the second time variant key same as the first time variant key is generated according to the second random number, the authentication information for authenticating the other information processing device is generated by the second time variant key, and the other information processing device is authenticated according to the authentication information.

According to still another embodiment, there is provided an information processing system in which a first information processing device receives a random number from a second information processing device, generates a first time variant key, encrypts the random number with the first time variant key, and transmits the encrypted random number to the second information processing device together with basic information as a basis of time variance of the first time variant key, and the second information processing device generates a second time variant key same as the first time variant key according to the basic information, generates authentication information with the second time variant key, and authenticates the first information processing device according to the authentication information.

In an embodiment, the first information processing device receives the first random number from the second information processing device, generates the second random number, generates the time variant key for encryption according to the second random number, encrypts the first random number with the time variant key, and transmits the first random number encrypted by the time variant key and the second random number to the second information processing device. The second information processing device generates the first random number, transmits the first random number to the first information processing device, receives the first random number encrypted by the first time variant key and the second random number from the first information processing device, generates the second time variant key same as the first time variant key according to the second random number, generates the authentication information for authenticating the first information processing device with the second time variant key, and authenticates the first information processing device according to the authentication information.

Besides the embodiments explained above, the present application also has embodiments explained below.

According to still another embodiment, there is provided an information processing device including: a receiving unit that received first information encrypted by using a first fixed key from another information processing device; a generating unit that generates the first fixed key and a second fixed key and a second random number; a decrypting unit that decrypts the received first information using the generated first fixed key to thereby acquire a first random number; an encrypting unit that applies a predetermined logic operation to the decrypted first random number and the generated second random number and encrypts a logic operation value obtained as a result of the logic operation using the second fixed key to thereby generate second information and encrypts the second random number using the second fixed key to thereby generate third information; and a transmitting unit that transmits the second information and the third information to the other information processing device.

Preferably, the receiving unit further receives fourth information encrypted by using the first fixed key from the other information processing device, the decrypting unit further decrypts the received fourth information using the generated first fixed key to thereby acquire a predetermined logic operation value of the first random number and the second random number and applies a predetermined logic operation to the acquired predetermined logic operation value and the decrypted first random number to thereby acquire the second random number, and the information processing device further includes an authenticating unit that performs authentication of the other information processing device according to the acquired second random number.

Preferably, the predetermined logic operation is XOR (exclusive OR).

Preferably, the information processing device is an IC card.

According to an embodiment, there is provided a computer program for causing a computer to execute processing for: receiving first information encrypted by using a first fixed key from another information processing device; generating the first fixed key; decrypting the received first information using the generated first fixed key to thereby acquire a first random number; generating a second fixed key and a second random number; applying a predetermined logic operation to the decrypted first random number and the generated second random number and encrypting a logic operation value obtained as a result of the logic operation using the second fixed key to thereby generate second information; encrypting the second random number using the second fixed key to thereby generate third information; and transmitting the second information and the third information to the other information processing device.

According to still another embodiment, there is provided an information processing device including: a generating unit that generates first and second fixed keys and a first random number; an encrypting unit that encrypts the first random number using the first fixed key to thereby generate first information; a transmitting unit that transmits the first information to another information processing device; a receiving unit that receives second information and third information from the other information processing device; a decrypting unit that decrypts the received second information using the generated second fixed key to thereby acquire a predetermined logic operation value of the first random number and a second random number, decrypts the received third information to thereby acquire the second random number, and applies a predetermined logic operation to the acquired predetermined logic operation value and the decrypted second random number to thereby acquire the first random number; and an authenticating unit that performs authentication of the other information processing device according to the acquired first random number.

Preferably, the encrypting unit further applies the predetermined logic operation to the generated first random number and the acquired second random number and encrypts the a logic operation value obtained as a result of the logic operation using the first fixed key to thereby generate fourth information, and the transmitting unit further transmits the fourth information to the other information processing device.

Preferably, the predetermined logic operation is XOR (exclusive OR).

Preferably, the information processing device is a reader writer.

According to an embodiment, there is provided a computer program for causing a computer to execute processing for: generating a first fixed key and a first random number; encrypting the first random number using the first fixed key to thereby generate first information; transmitting the first information to another information processing device; receiving second information and third information from the other information processing device; generating a second fixed key; decrypting the received second information using the generated second fixed key to thereby acquire a predetermined logic operation value of the first random number and a second random number; decrypting the received third information to thereby acquire the second random number; applying a predetermined logic operation to the acquired predetermined logic operation value and the decrypted second random number to thereby acquire the first random number; and performing authentication of the other information processing device according to the acquired first random number.

According to still another embodiment, there is provided an information processing system in which a first information processing device receives first information encrypted by using a first fixed key from a second information processing device, generates the first fixed key, decrypts the received first information using the generated first fixed key to thereby acquire a first random number, generates a second fixed key and a second random number, applies a predetermined logic operation to the decrypted first random number and the generated second random number and encrypts a logic operation value obtained as a result of the logic operation using the second fixed key to thereby generate second information, encrypts the second random number using the second fixed value to thereby generate third information, and transmits the second information and the third information to the second information processing device, and the second information processing device receives the second information and the third information from the first information processing device, generates a second fixed key, decrypts the received second information using the generated second fixed key to thereby acquire a predetermined logic operation value of the first random number and the second random number, decrypts the received third information to thereby acquire the second random number, applies the predetermined logic operation to the acquired predetermined logic operation value and the decrypted second random number to thereby acquire the first random number, and performs authentication of the first information processing device according to the acquired first random number.

According to still another embodiment, there is provided an information processing device including: a receiving unit that receives first information encrypted by using a first fixed key from another information processing device; a generating unit that generates the first fixed key and a second random number; a decrypting unit that decrypts the received first information using the generated first fixed key to thereby acquire a first random number; an encrypting unit that encrypts the decrypted first random number using the generated second random number as a key to thereby generate second information and encrypts the second random number using the first fixed key to thereby generate third information; and a transmitting unit that transmits the second information and the third information to the other information processing device.

Preferably, the receiving unit further receives fourth information encrypted by using the first random number as a key from the other information processing device, the decrypting unit further decrypts the received fourth information using the acquired first random number to thereby acquire the second random number, and the information processing device further includes an authenticating unit that performs authentication of the other information processing device according to the acquired second random number.

Preferably, the information processing device is an IC card.

According to an embodiment, there is provided a computer program for causing a computer to execute processing for: receiving first information encrypted by using a first fixed key from another information processing device; generating the first fixed key; decrypting the received first information using the generated first fixed key to thereby acquire a first random number; generating a second random number; encrypting the decrypted first random number using the generated second random number as a key to thereby generate second information; encrypting the second random number using the first fixed key to thereby generate third information; and transmitting the second information and the third information to the other information processing device.

According to still another embodiment, there is provided an information processing device including: a generating unit that generates a first fixed key and a first random number; an encrypting unit that encrypts the first random number using the first fixed key to thereby generate first information; a transmitting unit that transmits the first information to another information processing device; a receiving unit that receives second information and third information from the other information processing device; a decrypting unit that decrypts the received third information using the generated first fixed key to thereby acquire a second random number and decrypts the received second information using the acquired second random number to thereby acquire the first random number; and an authenticating unit that performs authentication of the other information processing device according to the acquired first random number.

Preferably, the encrypting unit further encrypts the acquired second random number using the generated first random number as a key to thereby generate fourth information, and the transmitting unit transmits the fourth information to the other information processing device.

Preferably, the information processing device is a reader writer.

According to an embodiment, there is provided a computer program for causing a computer to execute processing for: generating a first fixed key and a first random number; encrypting the first random number using the first fixed key to thereby generate first information; transmitting the first information to another information processing device; receiving second information and third information from the other information processing device; decrypting the received third information using the generated first fixed key to thereby acquire a second random number; decrypting the received second information using the acquired second random number to thereby acquire the first random number; and performing authentication of the other information processing device according to the acquired first random number.

According to still another embodiment, there is provided an information processing system in which a first information processing device receives first information encrypted by using a first fixed key from a second information processing device, generates the first fixed key, decrypts the received first information using the generated first fixed key to thereby acquire a first random number, generates a second random number, encrypts the decrypted first random number using the generated second random number as a key to thereby generate second information, encrypts the second random number using the first fixed key to thereby generate third information, and transmits the second information and the third information to the second information processing device, and the second information processing device generates the first fixed key and a first random number, encrypts the first random number using the first fixed key to thereby generate first information, transmits the first information to the first information processing device, receives the second information and the third information from the first information processing device, decrypts the received third information using the generated first fixed key to thereby acquire a second random number, decrypts the received second information using the acquired second random number to thereby acquire the first random umber, and performs authentication of the first information processing device according to the acquired first random number.

According to still another embodiment, there is provided an information processing device including: a receiving unit that receives first information encrypted by using a fixed key from another information processing device; a generating unit that generates the first fixed key and a second random number; a decrypting unit that decrypts the received first information using the generated first fixed key to thereby acquire a first random number; an encrypting unit that applies predetermined conversion processing to the decrypted first random number using the generated second random number, encrypts a result of the predetermined conversion processing using the second random number as a key to thereby generate second information, and encrypts the second random number using the first fixed key to thereby generate third information; and a transmitting unit that transmits the second information and the third information to the other information processing device.

Preferably, the receiving unit further receives fourth information encrypted by using the first random number as a key from the other information processing device, the decrypting unit further decrypts the received fourth information using the acquired first random number and applies inverse conversion processing of the predetermined conversion processing to the fourth information to thereby acquire the second random number, and the information processing device further includes an authenticating unit that performs authentication of the other information processing device according to the acquired second random number.

Preferably, the information processing device is an IC card.

According to an embodiment, there is provided a computer program for causing a computer to execute processing for: receiving first information encrypted by using a first fixed key from another information processing device; generating the first fixed key; decrypting the received first information using the generated first fixed key to thereby acquire a first random number; generating a second random number; applying predetermined conversion processing to the decrypted first random number using the generated second random number and encrypting a result of the predetermined conversion processing using the second random number as a key to thereby generate second information; encrypting the second random number using the first fixed key to thereby generate third information; and transmitting the second information and the third information to the other information processing device.

According to still another embodiment, there is provided an information processing device including: a generating unit that generates a first fixed key and a first random number; an encrypting unit that encrypts the first random number using the first fixed key to thereby generate first information; a transmitting unit that transmits the first information to another information processing device; a receiving unit that receives second information and third information from the other information processing device; a decrypting unit that decrypts the received third information using the generated first fixed key to thereby acquire a second random number and decrypts the received second information using the acquired second random number and applies inverse conversion processing of predetermined conversion processing to the second information to thereby acquire the first random number; and an authenticating unit that performs authentication of the other information processing device according to the acquired first random number.

Preferably, the encrypting unit further encrypts the acquired second random number using the generated first random number as a key and applies the predetermined conversion processing to the second random number to thereby generate fourth information, and the transmitting unit further transmits the fourth information to the other information processing device.

Preferably, the information processing device is a reader writer.

According to still another embodiment, there is provided a computer program for causing a computer to execute processing for: generating a first fixed key and a first random number; encrypting the first random number using the first fixed key to thereby generate first information; transmitting the first information to another information processing device; receiving second information and third information from the other information processing device; decrypting the received third information using the generated first fixed key to thereby acquire a second random number; decrypting the received second information using the acquired second random number and further applying inverse conversion processing of predetermined conversion processing to the second information to thereby acquire the first random number; and performing authentication of the other information processing device according to the acquired first random number.

According to still another embodiment, there is provided an information processing system in which a first information processing device receives first information encrypted by using a first fixed key from a second information processing device, generates the first fixed key, decrypts the received first information using the generated first fixed key to thereby acquire a first random number, generates a second random number, applies predetermined conversion processing to the decrypted first random number using the generated second random number and encrypts a result of the predetermined conversion processing using the second random number as a key to thereby generate second information, encrypts the second random number using the first fixed key to thereby generate third information, and transmits the second information and the third information to the second information processing device, and the second information processing device generates a first fixed key and a first random number, encrypts the first random number using the first fixed key to thereby generate first information, transmits the first information to the first information processing device, receives the second information and the third information from the first information processing device, decrypts the received third information using the generated first fixed key to thereby acquire the second random number, decrypts the received second information using the acquired second random number and further applying inverse conversion processing of predetermined conversion processing to the second information to thereby acquire the first random number, and performs authentication of the first information processing device according to the acquired first random number.

As explained above, according to the embodiments, it is possible to prevent illegal access.

Additional features and advantages are described in, and will be apparent from, the following Detailed Description and the figures.

BRIEF DESCRIPTION OF THE FIGURES

FIG. 6 is a diagram for explaining bidirectional authentication processing in the past;

FIG. 7 is a block diagram of a configuration example of an information processing system according to an embodiment;

FIG. 8 is a block diagram of a configuration example of one information processing device that configures the information processing system;

DETAILED DESCRIPTION

Figure 1:
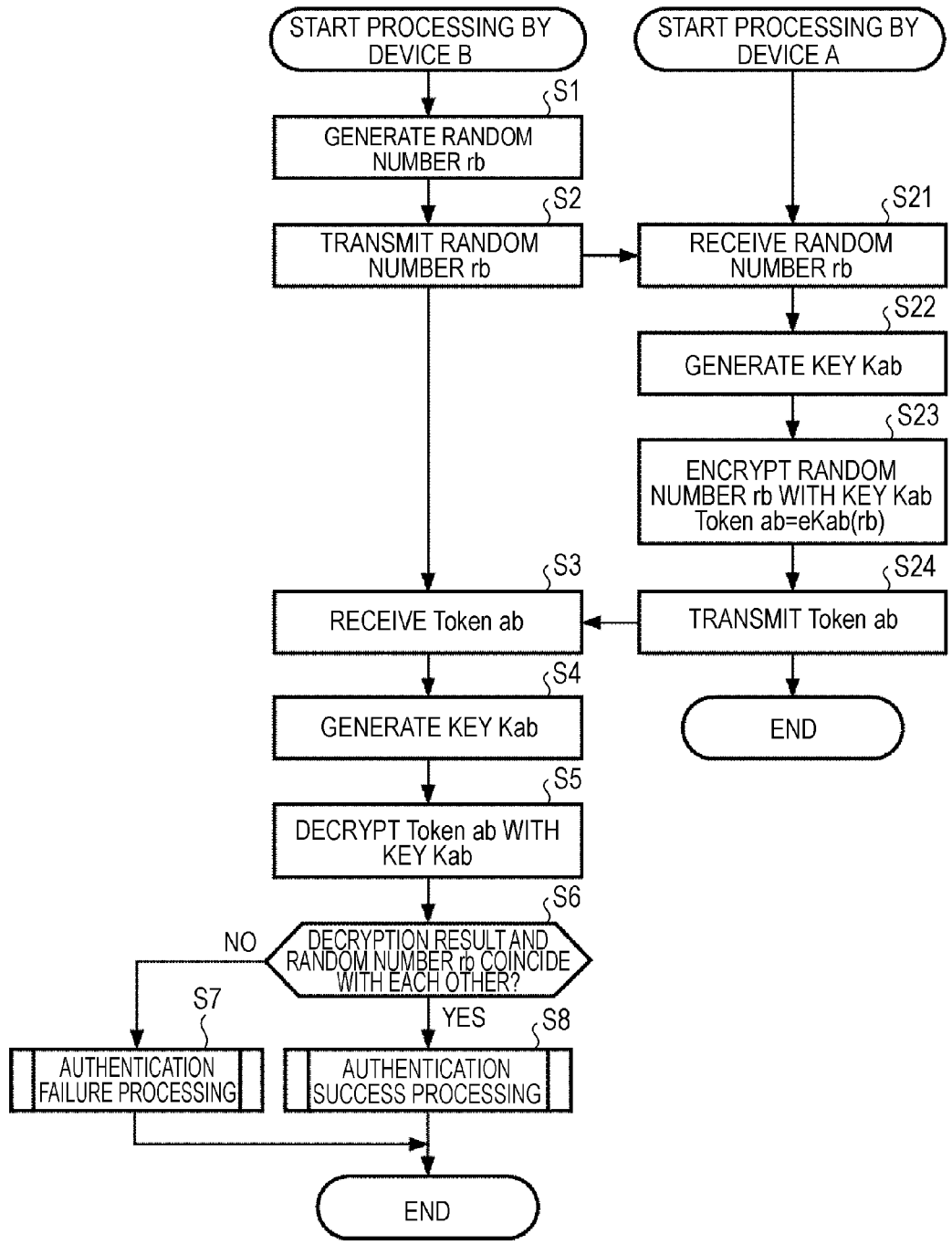
FIG. 1 is a flowchart for explaining unidirectional authentication processing in the past.
Figure 2:
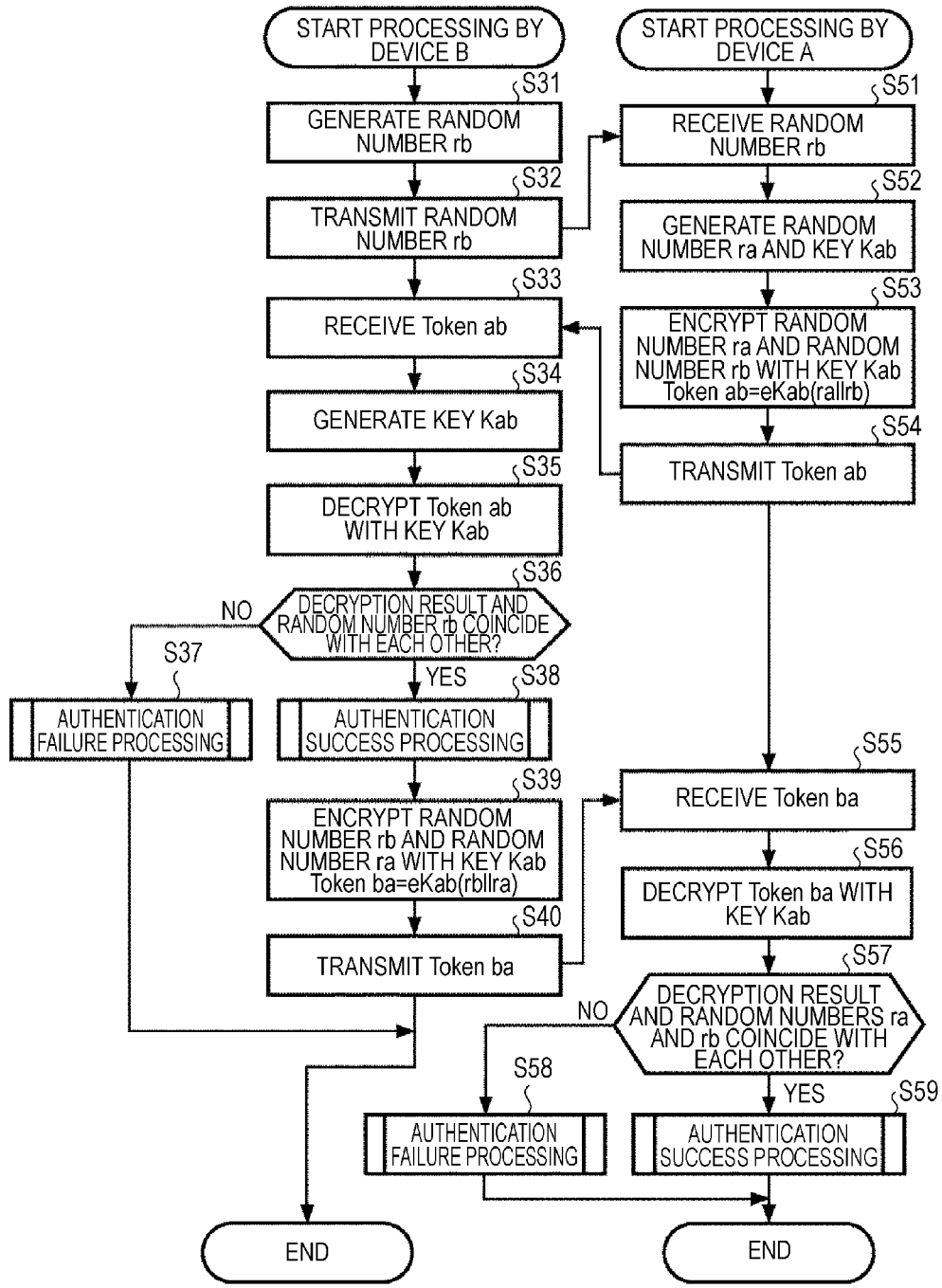
FIG. 2 is a flowchart for explaining bidirectional authentication processing in the past.
Figure 3:
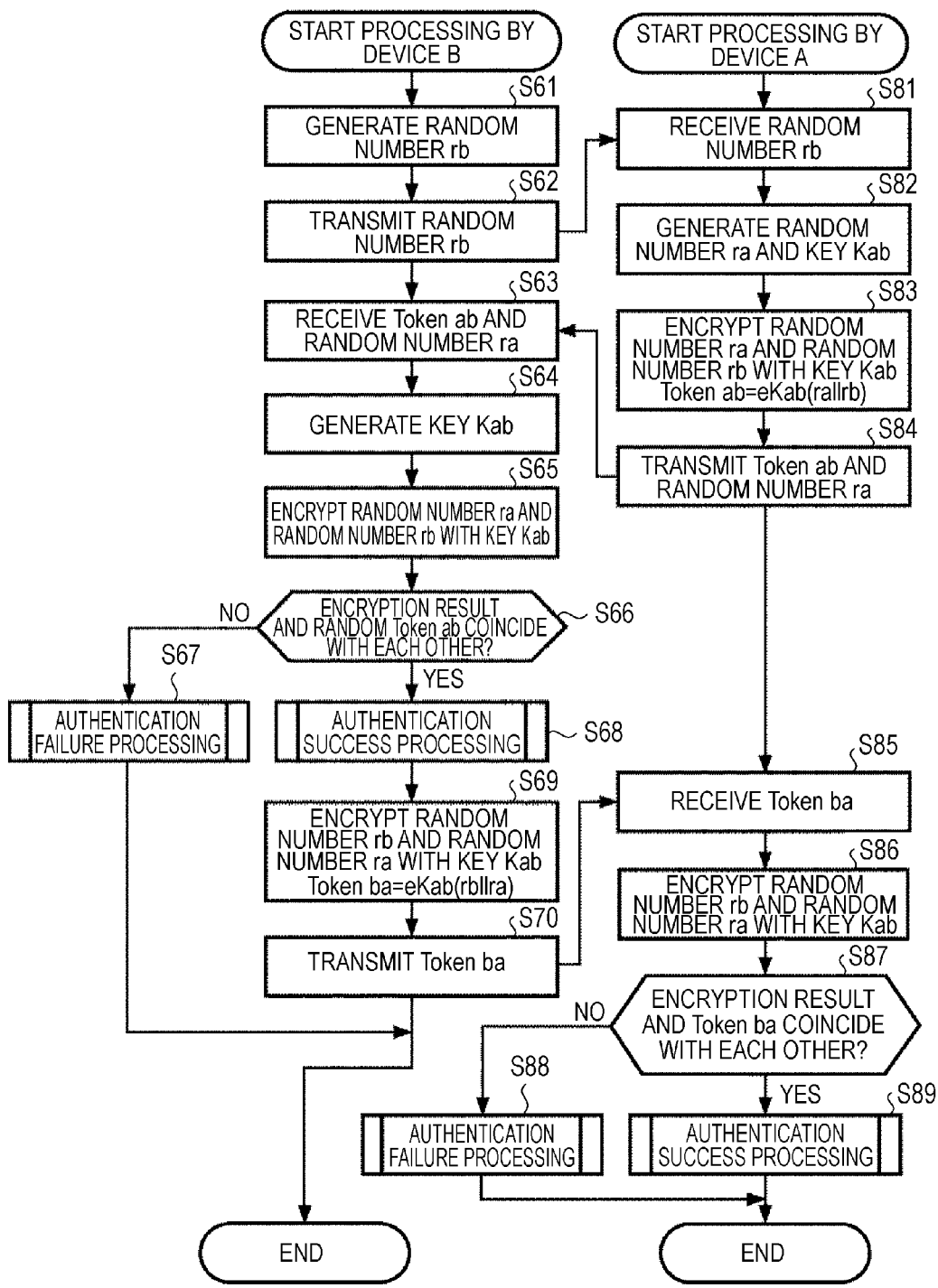
FIG. 3 is a flowchart for explaining bidirectional authentication processing in the past.
Figure 4:
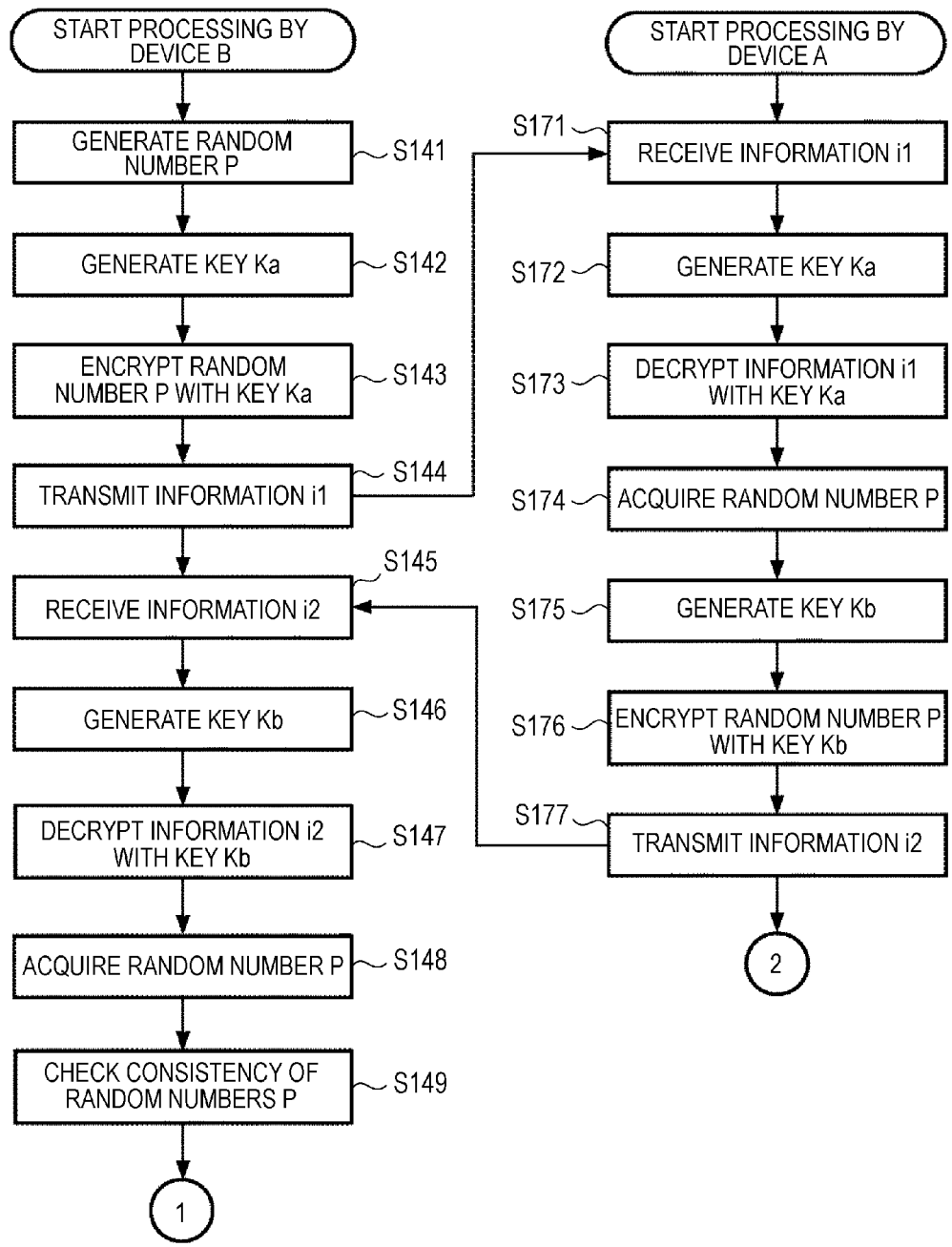
FIG. 4 is a flowchart for explaining bidirectional authentication processing in the past.
Figure 5:
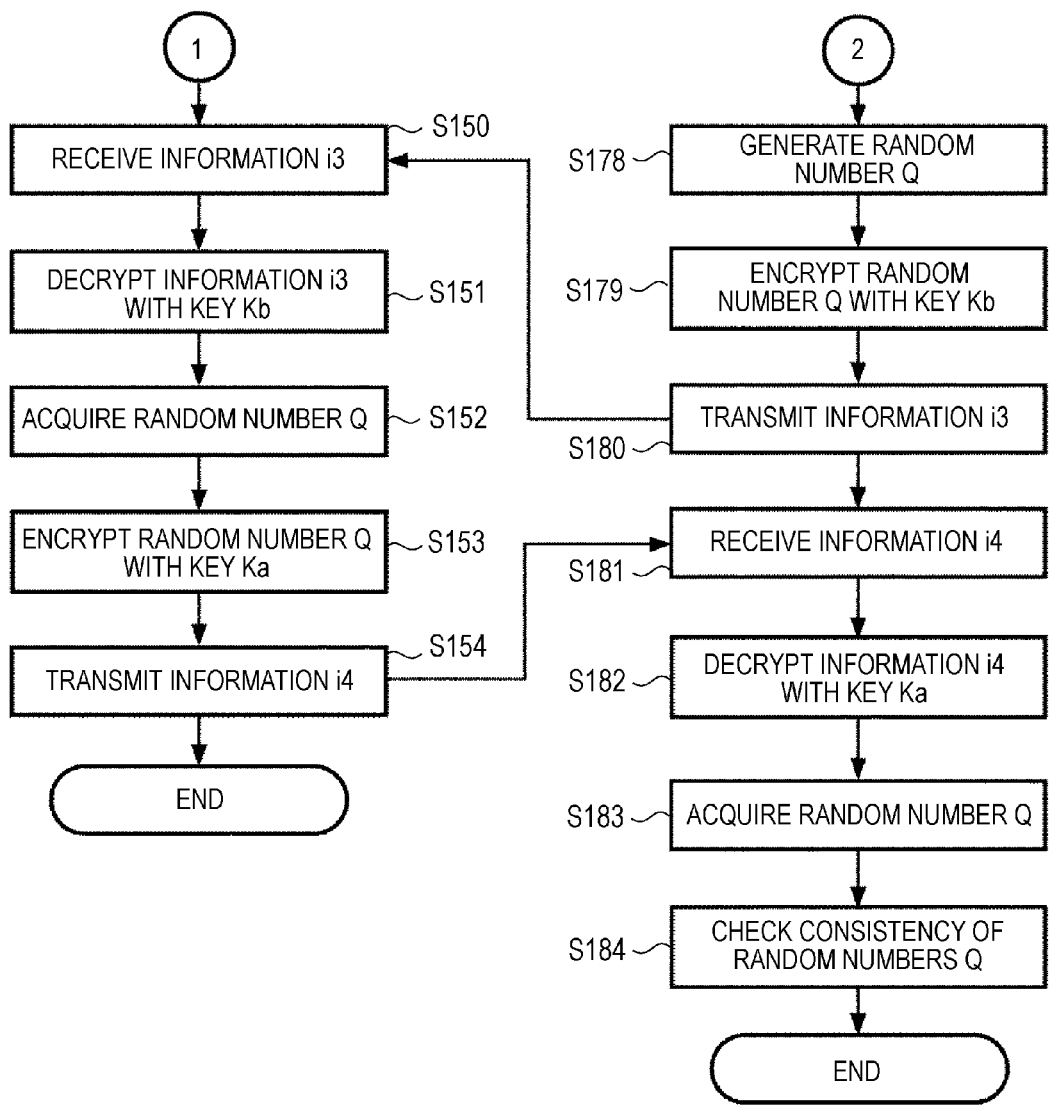
FIG. 5 is a flowchart for explaining the bidirectional authentication processing in the past.

The present application is described in detail below with reference to the accompanying drawings according to an embodiment:
1. Configuration example of an information processing system
2. First embodiment
3. Second embodiment
4. Third embodiment
5. Fourth embodiment
6. Fifth embodiment.

1. Configuration Example of an Information Processing System

An embodiment is explained below with reference to the accompanying drawings.

FIG. 7 is a block diagram of a configuration of an information processing system according to the embodiment. This information processing system 100 includes an information processing device 111 and an information processing device 141. The information processing device 111 is, for example, an IC card. The information processing device 141 is, for example, a reader writer that accesses the IC card. The information processing device 111 and the information processing device 141 perform, for example, near distance communication and exchange information. The information processing device 141 is connected to a not-shown computer when necessary.

FIG. 8 is a block diagram of a configuration of the information processing device 111 according to this embodiment. In this embodiment, the information processing device 111 includes an antenna unit 121, a receiving unit 122, a decrypting unit 123, an authenticating unit 124, an encrypting unit 125, a transmitting unit 126, a generating unit 127, a generating unit 128, and a storing unit 129.

The antenna unit 121 communicates with an antenna unit 151 (see FIG. 9 referred to later) of the information processing device 141 by exchanging electromagnetic waves. The receiving unit 122 receives, via the antenna unit 121, a signal transmitted from the information processing device 141 and demodulates the signal. The decrypting unit 123 decrypts encrypted information received by the receiving unit 122. The authenticating unit 124 authenticates the information processing device 141 on the basis of information from the decrypting unit 123 and the like and controls the respective units.

The encrypting unit 125 is controlled by the authenticating unit 124 and encrypts information to be transmitted to the information processing device 141. The encrypting unit 125 applies predetermined logic operation processing or predetermined conversion processing and inverse conversion processing of the conversion processing to the information to be transmitted to the information processing device 141 or information transmitted from the information processing device 141. The transmitting unit 126 modulates information supplied from the encrypting unit 125 or the like, outputs the information to the antenna unit 121, and causes the antenna unit 121 to transmit the information to the information processing device 141. The generating unit 127 generates a key for encrypting or decrypting information. The key may be calculated and generated every time or may be generated by reading out a stored key. The generating unit 127 generates a random number. The random number does not need to be a random number in a mathematical sense and may be any number such as a pseudo random number or a counter value generated by a counter as long as the number can be practically treated as a random number.

The generating unit 128 generates a time variant key on the basis of information from the generating unit 127 or the like and supplies the time variant key to the decrypting unit 123 and the encrypting unit 125. The time variant key is a key that changes every time the time variant key is generated. The storing unit 129 is connected to the authenticating unit 124 and stores necessary data, programs, and other information.

An output of the receiving unit 122 is supplied to the authenticating unit 124, the encrypting unit 125, the generating unit 128, and the like besides the decrypting unit 123. An output of the authenticating unit 124 is supplied to the transmitting unit 126 and the like besides the encrypting unit 125. An output of the generating unit 127 is supplied to the decrypting unit 123, the authenticating unit 124, the encrypting unit 125, the transmitting unit 126, and the like besides the generating unit 128. An output of the generating unit 128 is supplied to the authenticating unit 124 besides the decrypting unit 123 and the encrypting unit 125.

Figure 9:
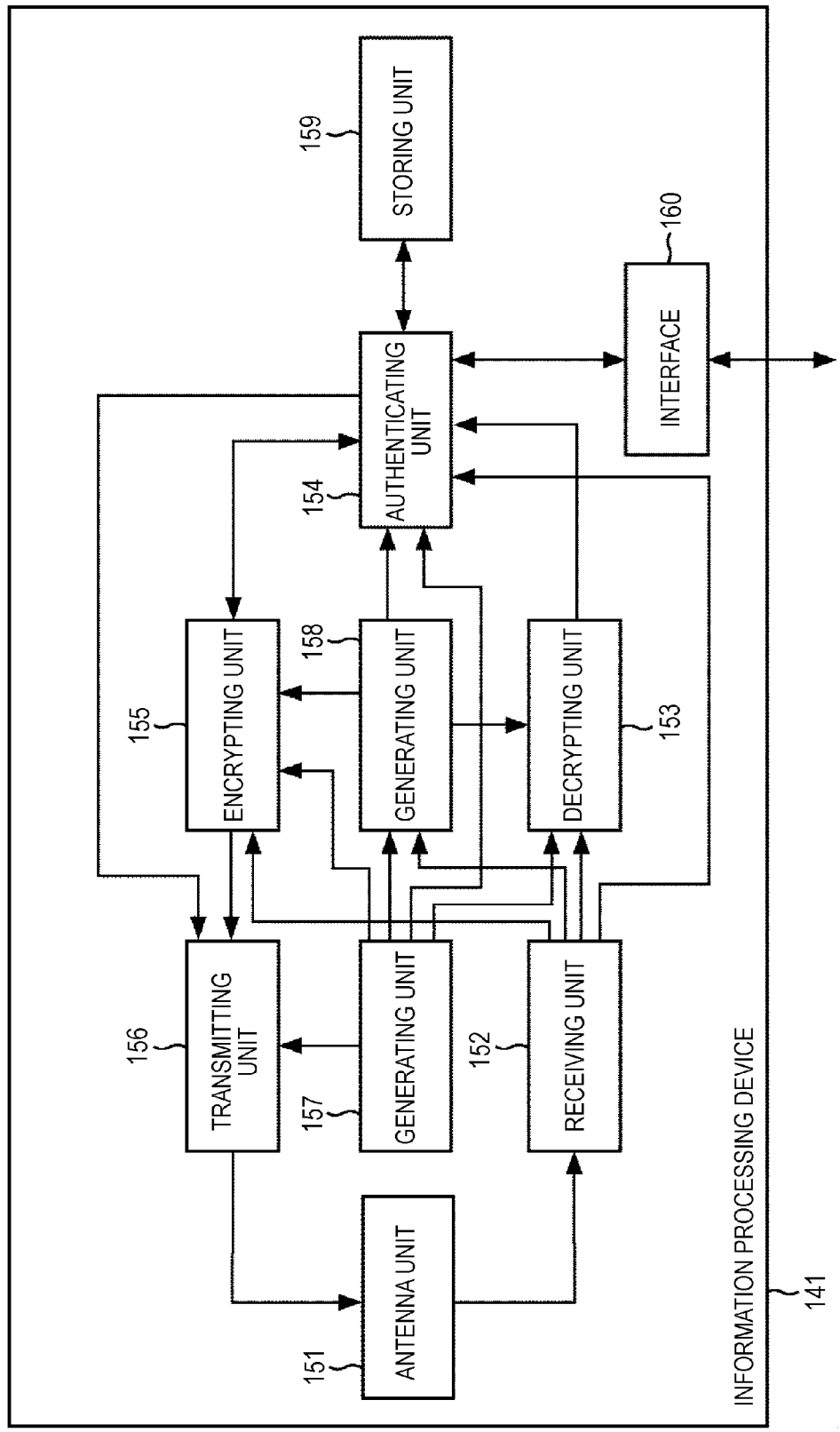
FIG. 9 is a block diagram of a configuration example of the other information processing device that configures the information processing system.

FIG. 9 is a block diagram of a configuration of the information processing device 141 according to this embodiment. In this embodiment, the information processing device 141 includes an antenna unit 151, a receiving unit 155, a decrypting unit 153, an authenticating unit 154, an encrypting unit 155, a transmitting unit 156, a generating unit 157, a generating unit 158, a storing unit 159, and an interface 160.

The antenna unit 121 communicates with the antenna unit 121 of the information processing device 111 by exchanging electromagnetic waves. The receiving unit 152 receives, via the antenna unit 151, a signal transmitted from the information processing device 111 and demodulates the signal. The decrypting unit 153 decrypts encrypted information received by the receiving unit 152. The authenticating unit 154 authenticates the information processing device 141 on the basis of information from the decrypting unit 153 and the like and controls the respective units.

The encrypting unit 155 is controlled by the authenticating unit 154 and encrypts information to be transmitted to the information processing device 111. The encrypting unit 155 applies predetermined logic operation processing or predetermined conversion processing and inverse conversion processing of the conversion processing to the information to be transmitted to the information processing device 111 or information transmitted from the information processing device 111. The transmitting unit 156 modulates information supplied from the encrypting unit 155 or the like, outputs the information to the antenna unit 151, and causes the antenna unit 151 to transmit the information to the information processing device 111. The generating unit 157 generates a key for encrypting or decrypting information. The key may be calculated and generated every time or may be generated by reading out a stored key. The generating unit 157 generates a random number. The random number does not need to be a random number in a mathematical sense and may be any number such as a pseudo random number as long as the number can be practically treated as a random number.

The generating unit 158 generates a time variant key on the basis of information from the generating unit 157 or the like and supplies the time variant key to the decrypting unit 153 and the encrypting unit 155. The storing unit 159 is connected to the authenticating unit 154 and stores necessary data, programs, and other information. The interface 160 connected to the authenticating unit 154 communicates with an external computer.

An output of the receiving unit 152 is supplied to the authenticating unit 154, the encrypting unit 155, the generating unit 158, and the like besides the decrypting unit 153. An output of the authenticating unit 154 is supplied to the transmitting unit 156 and the like besides the encrypting unit 155. An output of the generating unit 157 is supplied to the decrypting unit 153, the authenticating unit 154, the encrypting unit 155, the transmitting unit 156, and the like besides the generating unit 158. An output of the generating unit 158 is supplied to the authenticating unit 154 besides the decrypting unit 153 and the encrypting unit 155.

2. First Embodiment

Authentication processing of a first system according to a first embodiment is explained. In the authentication processing of the first system, a random number used for authentication is transmitted, in an encrypted state, from a device to be authenticated to an authenticating device.

Figure 10:
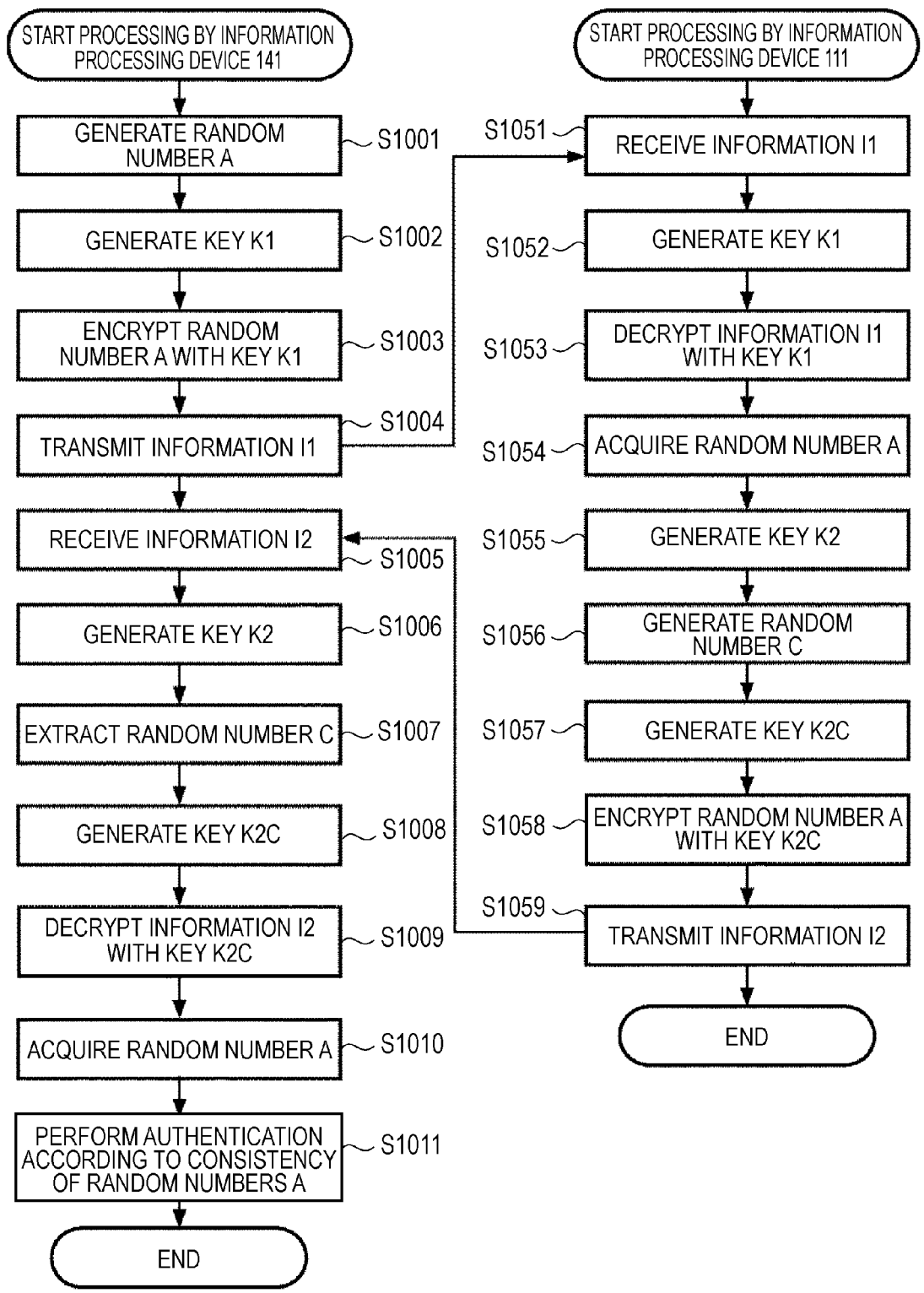
FIG. 10 is a flowchart for explaining unidirectional authentication processing of a first system according to a first embodiment.

First, unidirectional authentication processing is explained with reference to FIG. 10.

In the information processing device 141, in step S1001, the generating unit 157 generates a random number A. In step S1002, the generating unit 157 generates a key K1. In step S1003, the encrypting unit 155 encrypts the random number A with the key K1. Specifically, the following formula is calculated. In the formula, eK1(A) means that the random number A1 is encrypted by the key K1.

$$\text{Token } BA = eK1(A) \qquad \text{Formula 7}$$

In step S1004, the transmitting unit 156 transmits information I1 to the information processing device 111. The information I1 is transmitted to the information processing device 111 via the antenna unit 151. The information I1 includes information Token BA calculated by Formula 7.

In the information processing device 111, in step S1051, the receiving unit 122 receives, via the antenna unit 121, the information I1 transmitted from the information processing device 141. In step S1052, the generating unit 127 generates the key K1. In step S1053, the decrypting unit 123 decrypts the information I1 with the key K1. Consequently, in step S1054, the decrypting unit 123 acquires the random number A.

In step S1055, the generating unit 127 generates a key K2. In step S1056, the generating unit 127 generates a random number C. In step S1057, the generating unit 128 generates a key K2C. Specifically, the generating unit 128 causes the random number C to act on the fixed key K2 to generate the key K2C according to the following formula:

$$K2C = f(C, K2) \qquad \text{Formula 8}$$

Since the random number C changes every time, the key K2C calculated by causing the random number C to act on the fixed key K2 is a time variant key that changes every time. Therefore, the random number C is a random number as basic information serving as a basis of time variance of the time variant key.

In step S1058, the encrypting unit 125 encrypts the random number A with the key K2C. Specifically, the following formula is calculated:

$$\text{Token } AB = eK2C(A) \qquad \text{Formula 9}$$

In step S1059, the transmitting unit 126 transmits the information I2 to the information processing device 141. The information I2 is transmitted to the information processing device 141 via the antenna unit 121. The information I2 includes information Token AB calculated by Formula 9 and the random number C generated in step S1056.

In information processing device 141, in step S1005, the receiving unit 152 receives, via the antenna unit 151, the information I2 transmitted from the information processing device 111. In step S1006, the generating unit 157 generates the key K2. In step S1007, the generating unit 158 extracts the random number C from the information I2 received in step S1005. In step S1008, the generating unit 158 generates the key K2C. Specifically, the following formula is calculated:

$$K2C = f(C, K2) \qquad \text{Formula 10}$$

In step S1008, the decrypting unit 153 as an authentication-information generating unit performs processing for generating authentication information for performing authentication determination in step S1011. Specifically, in the case of this unidirectional authentication processing, the decrypting unit 153 decrypts the information I2 with the key K2C. Consequently, in step S1010, the decrypting unit 153 acquires the random number A.

In step S1011, the authenticating unit 154 performs authentication according to consistency of the random numbers A. Specifically, the authenticating unit 154 determines whether the random number A generated in step S1001 and encrypted and transmitted to the information processing device 111 in step S1003 and the random number A acquired in step S1010 coincide with each other. The key K1 and the key K2 are secret keys kept by only the regular information processing device 111. Therefore, when the information processing device 111 is a regular information processing device, the two random numbers A coincide with each other. On the other hand, when the information processing device 111 is not a regular information processing device, since the information processing device 111 does not keep the key K1 and the key K2, the two random numbers A do not coincide with each other. Therefore, the information processing device 141 can authenticate the information processing device 111 from the coincidence of the two random numbers.

As explained above, the information processing device 141 authenticates the information processing device 111.

Figure 11:
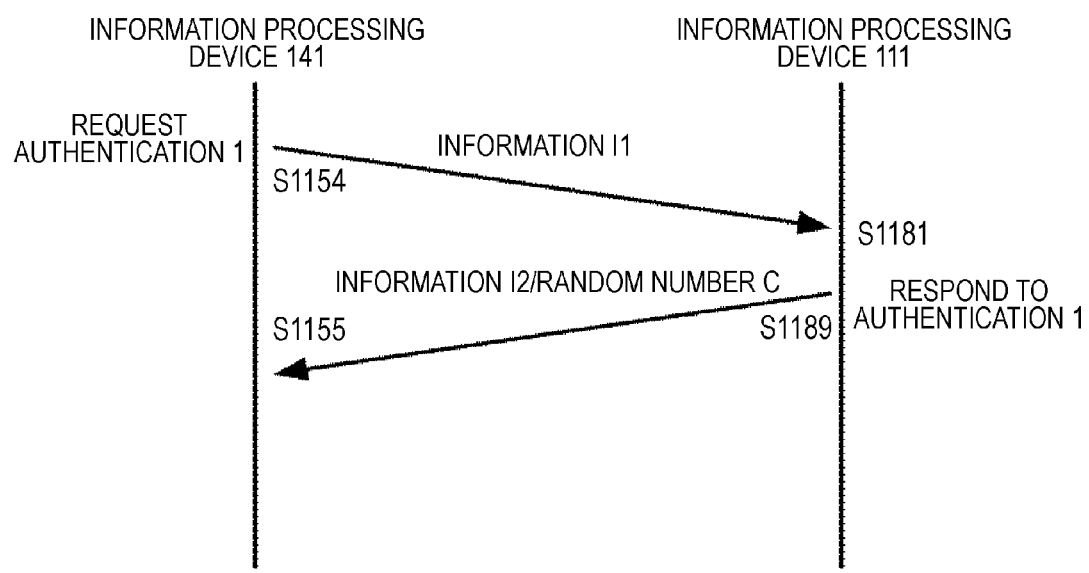
FIG. 11 is a diagram for explaining authentication processing according to the first embodiment.

The exchange of the information between the two devices in the processing explained above is represented as shown in FIG. 11. In step S1154, the information processing device 141 transmits the information I1 to the information processing device 111. In step S1189, the information processing device 111 transmits the information I2 to the information processing device 141 together with the random number C.

In step S1154, the information processing device 141 supplies the same information I1 to the information processing device 111 plural times. In step S1155, the information processing device 141 can obtain the information I2 as a result of processing for the information I1. However, the information I2 as the processing result is calculated by the time variant key K2C that changes every time. Therefore, even if a large number of processing results are collected and analyzed by DFA attack, it is difficult to specify a key that processes the data. In other words, the data can be protected from the DFA attack.

Bidirectional authentication processing of the first system is explained with reference to flowcharts of FIGS. 12 and 13.

First, the information processing device 141 performs processing for authenticating the information processing device 111. This processing is substantially the same as the processing shown in FIG. 10.

In step S1151, the generating unit 157 of the information processing device 141 generates the random number A. In step S1152, the generating unit 157 generates the key K1. In step S1153, the encrypting unit 155 encrypts the random number A with the key K1. Specifically, the following formula is calculated:

$$\text{Token } BA = eK1(A) \qquad \text{Formula 11}$$

In step S1154, the transmitting unit 156 transmits the information I1 to the information processing device 111. The information I1 includes information Token BA calculated by Formula 11.

In the information processing device 111, in step S1181, the receiving unit 122 receives the information I1 transmitted from the information processing device 141. In step S1182, the generating unit 127 generates the key K1. In step S1183, the decrypting unit 123 decrypts the information I1 with the key K1. Consequently, in step S1184, the decrypting unit 123 acquires the random number A.

In step S1185, the generating unit 127 generates the key K2. In step S1186, the generating unit 127 generates the random number C. In step S1187, the generating unit 128 generates the key K2C. Specifically, the generating unit 128 causes the random number C to act on the fixed key K2 to generate the key K2C according to the following formula:

$$K2C = f(C, K2) \qquad \text{Formula 12}$$

In step S1188, the encrypting unit 125 encrypts the random number A with the key K2C. Specifically, the following formula is calculated:

$$\text{Token } AB = eK2C(A) \qquad \text{Formula 13}$$

In step S1189, the transmitting unit 126 transmits the information I2 to the information processing device 141. The information I2 includes information Token AB calculated by Formula 13 and the random number C generated in step S1186.

In the information processing device 141, in step S1155, the receiving unit 152 receives the information I2 transmitted from the information processing device 111. In step S1156, the generating unit 157 generates the key K2. In step S1157, the generating unit 158 extracts the random number C from the information I2 received in step S1155. In step S1158, the generating unit 158 generates the key K2C. Specifically, the following formula is calculated:

$$K2C = f(C, K2) \qquad \text{Formula 14}$$

In step S1159, the decrypting unit 153 as the authentication-information generating unit performs processing for generating authentication information for performing authentication determination in step S1161. Specifically, in the case of this bidirectional authentication processing, the decrypting unit 153 decrypts the information I2 with the key K2C. Consequently, in step S1160, the decrypting unit 153 acquires the random number A.

In step S1161, the authenticating unit 154 performs authentication according to consistency of the random numbers A. Specifically, the authenticating unit 154 determines whether the random number A generated in step S1151 and encrypted and transmitted to the information processing device 111 in step S1153 and the random number A acquired in step S1160 coincide with each other. The key K1 and the key K2 are secret keys kept by only the regular information processing device 111. Therefore, when the information processing device 111 is a regular information processing device, the two random numbers A coincide with each other. On the other hand, when the information processing device 111 is not a regular information processing device, since the information processing device 111 does not keep the key K1 and the key K2, the two random numbers A do not coincide with each other. Therefore, the information processing device 141 can authenticate the information processing device 111 from the coincidence of the two random numbers.

When the information processing device 141 authenticates the information processing device 111 as explained above, subsequently, the information processing device 111 performs processing for authenticating the information processing device 141.

In the information processing device 111, in step S1190, the generating unit 127 generates a random number B. In step S1191, the encrypting unit 125 encrypts the random number B with the key K2C. Specifically, the following formula is calculated:

$$\text{Token } AB = eK2C(B) \qquad \text{Formula 15}$$

In step S1192, the transmitting unit 126 transmits information I3 to the information processing device 141. The information I3 includes information Token AB calculated by Formula 15 and the random number B generated in step S1190.

In the information processing device 141, in step S1162, the receiving unit 152 receives the information I3 transmitted from the information processing device 111. In step S1163, the decrypting unit 153 decrypts the information I3 with the key K2C. The key K2C is generated in step S1158. The information I3 includes information obtained by encrypting the random number B with the key K2C in step S1191. Consequently, in step S1164, the decrypting unit 153 acquires the random number B.

In step S1165, the encrypting unit 155 encrypts the random number B with the key K1. Specifically, the following formula is calculated:

$$\text{Token } BA = eK1(B) \qquad \text{Formula 16}$$

In step S1166, the transmitting unit 156 transmits information I4 to the information processing device 111. The information I4 includes information Token BA calculated by Formula 16.

In the information processing device 111, in step S1193, the receiving unit 122 receives the information I4 transmitted from the information processing device 141. In step S1194, the decrypting unit 123 as an authentication-information generating unit performs processing for generating authentication information for performing authentication determination in step S1196. Specifically, in the case of this bidirectional authentication processing, the decrypting unit 123 decrypts the information I4 with the key K1. Consequently, in step S1195, the decrypting unit 123 acquires the random number B. The key K1 is generated in step S1182.

In step S1196, the authenticating unit 124 performs authentication according to consistency of the random numbers B. Specifically, in step S1191, the authenticating unit 124 determines whether the random number B encrypted and transmitted to the information processing device 141 in step S1191 and the random number B acquired in step S1195 coincide with each other. The key K1 and the key K2 are secret keys kept by only the regular information processing device 141. Therefore, when the information processing device 141 is a regular information processing device, the two random numbers B coincide with each other. On the other hand, when the information processing device 141 is not a regular information processing device, since the information processing device 141 does not keep the key K1 and the key K2, the two random numbers B do not coincide with each other. Therefore, the information processing device 111 can authenticate the information processing device 141 from coincidence of the two random numbers. An authentication result is transmitted to the information processing device 141.

Figure 12:
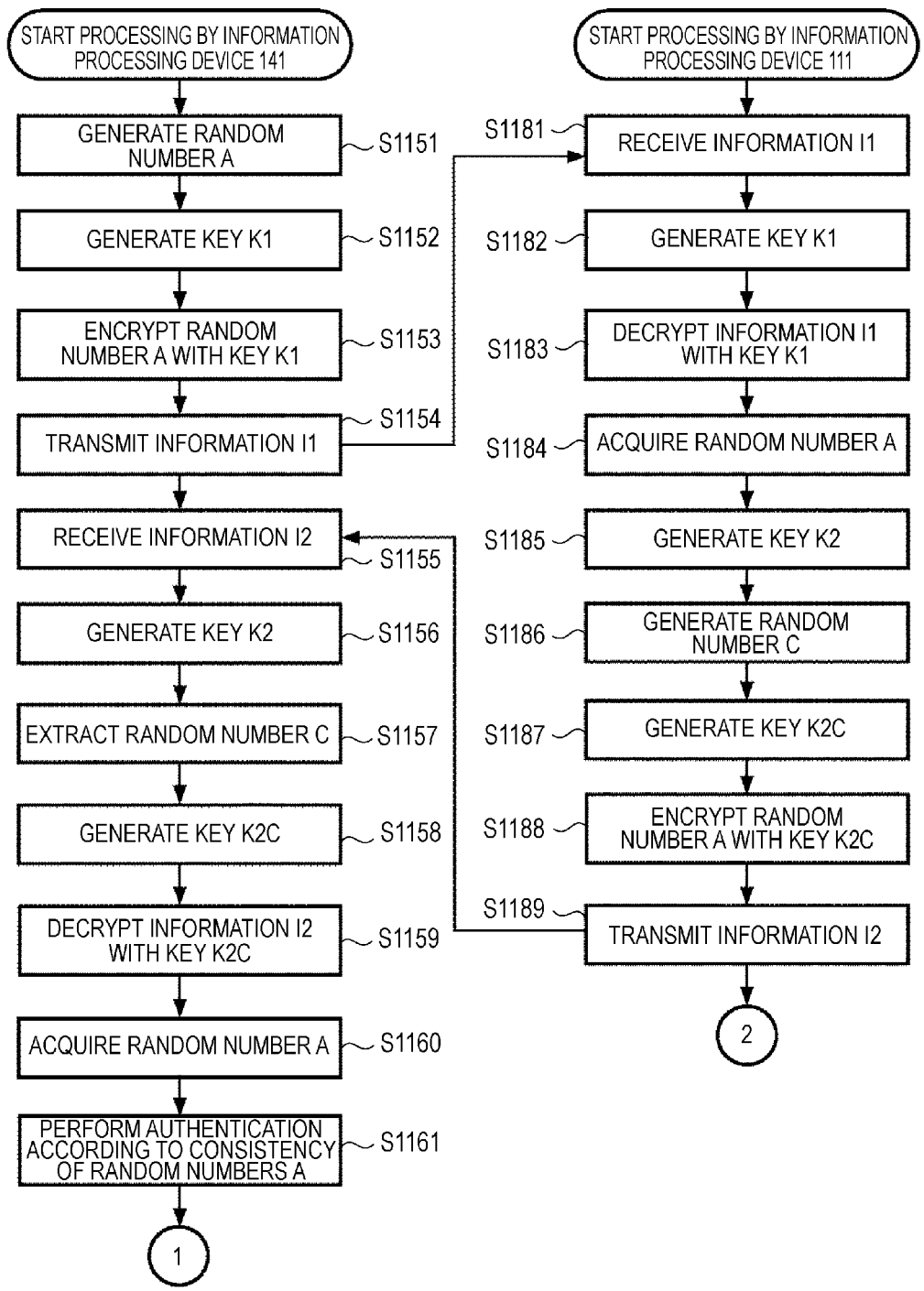
FIG. 12 is a flowchart for explaining bidirectional authentication processing of the first system according to the first embodiment.
Figure 13:
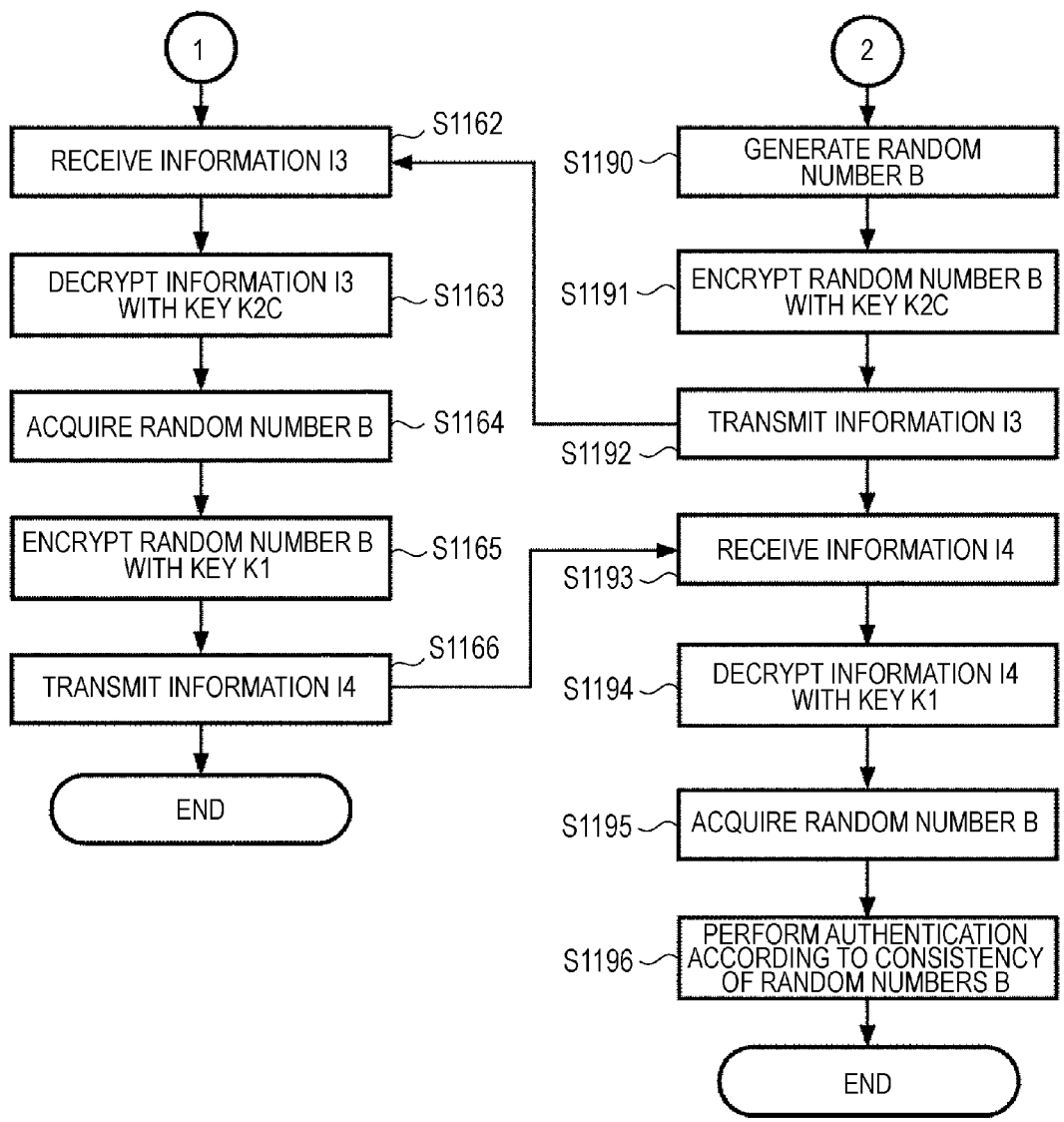
FIG. 13 is a flowchart for explaining the bidirectional authentication processing of the first system according to the first embodiment.

In the bidirectional authentication processing shown in FIGS. 12 and 13, the decrypting unit 123 decrypts the information I4 in step S1194 to obtain the random number B and the authenticating unit 124 performs authentication according to consistency on the basis of the random numbers B in step S1196. However, authentication can be performed in a state in which the random number B is encrypted. Bidirectional authentication processing in this case is shown in FIGS. 14 and 15.

Figure 14:
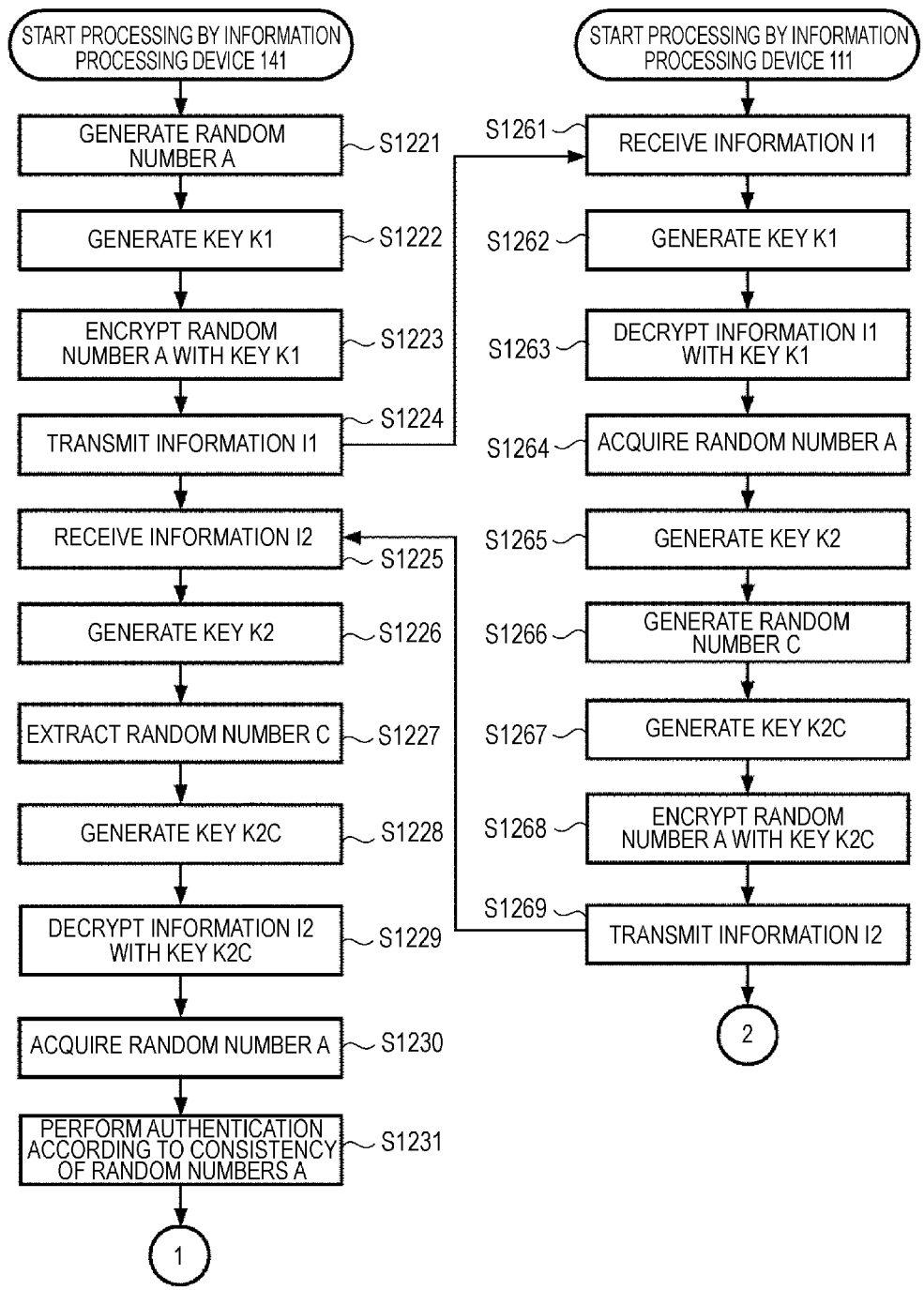
FIG. 14 is a flowchart for explaining bidirectional authentication processing of the first system according to the first embodiment.
Figure 15:
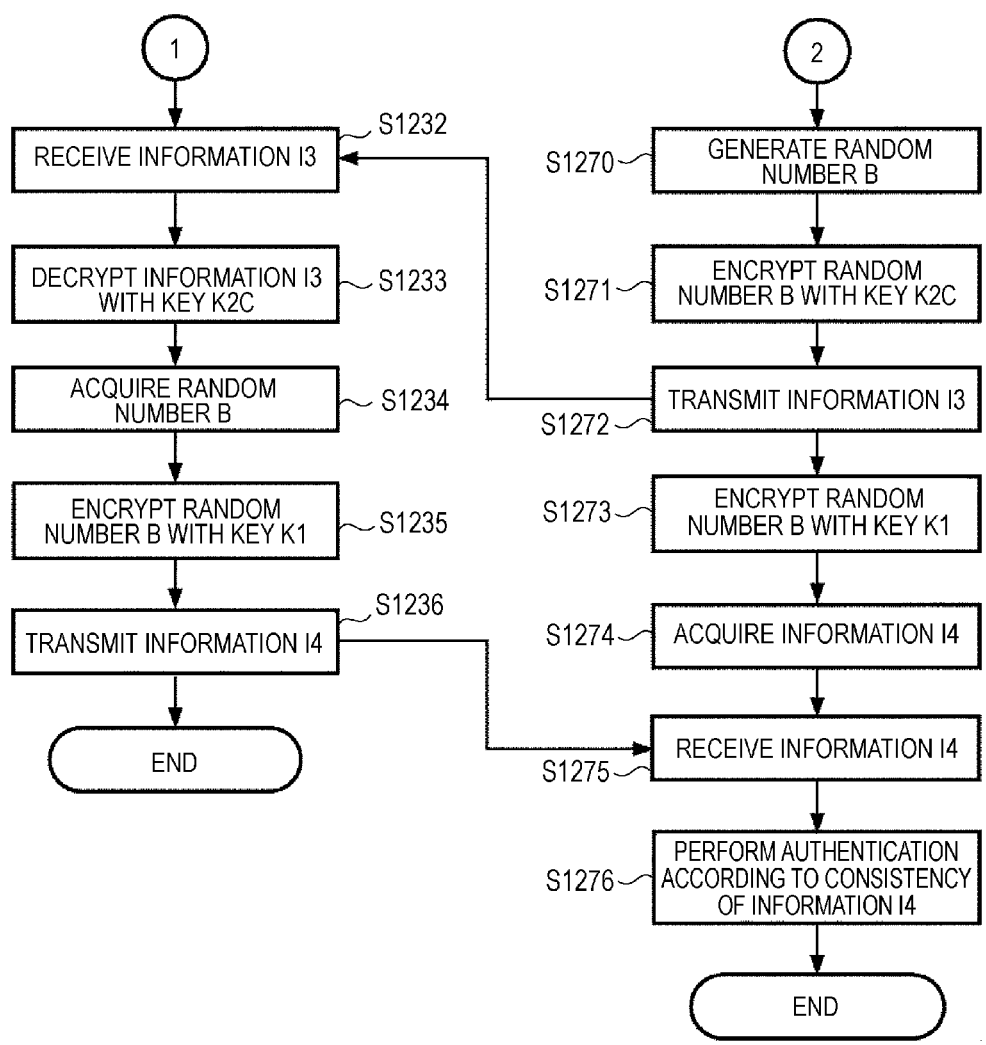
FIG. 15 is a flowchart for explaining the bidirectional authentication processing of the first system according to the first embodiment.

Processing by the information processing device 141 in steps S1221 to S1236 in FIGS. 14 and 15 is the same as the processing in steps S1151 to S1166 in FIGS. 12 and 13. Processing by the information processing device 111 in steps S1261 to S1272 in FIGS. 14 and 15 is the same as the processing in steps S1181 to S1192 in FIGS. 12 and 13. Processing in steps S1273 to S1276 in FIG. 15 is different from the processing in steps S1194 to S1196 in FIG. 13.

In the bidirectional authentication processing shown in FIGS. 14 and 15, in step S1273, the encrypting unit 125 of the information processing device 111 as the authentication-information generating unit performs processing for generating authentication information for performing authentication determination in step S1276. Specifically, in this bidirectional authentication processing, the encrypting unit 125 encrypts the random number B with the key K1. Specifically, the following formula is calculated. The key K1 is generated in step S1262.

$$\text{Token } AB = eK1(B) \qquad \text{Formula 17}$$

Consequently, in step S1274, the generating unit 127 acquires the information I4. The information I4 includes information Token AB calculated by Formula 17, i.e., the random number B encrypted by the key K1.

In step S1275, the receiving unit 122 receives the information I4 transmitted from the information processing device 141. The information I4 includes the random number B encrypted by the key K1 in step S1235. Therefore, authentication can be performed according to consistency of the information I4 (the encrypted random numbers B) in step S1276. Specifically, if the information I4 (the encrypted random number B) acquired in step S1274 and the information I4 (the encrypted random number B) received in step S1275 coincide with each other, the information processing device 141 is authenticated.

As explained above, in step S1196 in FIG. 13, the random numbers B in an unencrypted state are compared. On the other hand, in step S1276 in FIG. 15, the random numbers B in an encrypted state are compared.

3. Second Embodiment

Authentication processing of a second system according to a second embodiment is explained. In the authentication processing of the second system, a random number used for authentication is transmitted, without being encrypted, from an authenticating device to a device to be authenticated.

Figure 16:
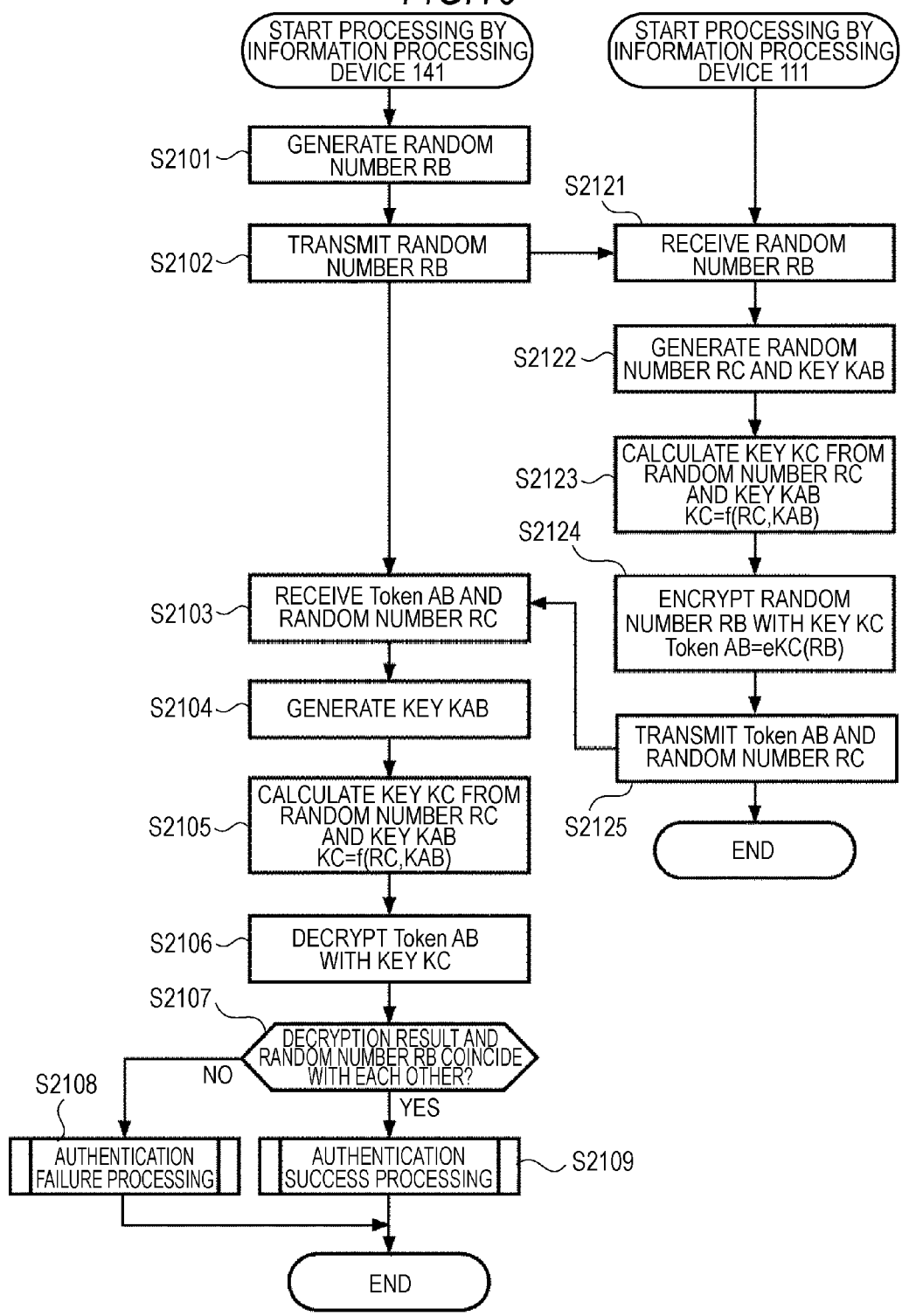
FIG. 16 is a flowchart for explaining unidirectional authentication processing of a second system according to a second embodiment.

First, unidirectional authentication processing is explained with reference to FIG. 16. In the case of this unidirectional authentication processing, the information processing device 141 authenticates the information processing device 111.

Step S2101, the generating unit 157 of the information processing device 141 generates a random number RB. In step S2102, the transmitting unit 156 transmits the random number RB input from the generating unit 157. The random number RB is supplied to the information processing device 111 via the antenna unit 151.

In step S2121, the receiving unit 122 of the information processing device 111 receives, via the antenna unit 121, the random number RB transmitted from the information processing device 141. In step S2122, the generating unit 127 generates a random number RC and a key KAB. The random number RC is basic information serving as a basis for varying the key KC, which is a time variant key, with time in processing in the next step S2123. The key KAB is a secret key kept in advance only by the regular information processing device 111.

In step S2123, the generating unit 128 calculates a key KC from the random number RC and the key KAB. Specifically, the following formula is calculated:

$$KC = f(RC, KAB) \qquad \text{Formula 18}$$

Since the random number RC changes every time, the key KC calculated by causing the random number RC to act on the fixed key KAB is a time variant key that changes every time.

In step S2124, the encrypting unit 125 encrypts the random number RB with the key KC. Specifically, the following formula is calculated:

$$\text{Token } AB = eKC(RB) \qquad \text{Formula 19}$$

In step S2125, the transmitting unit 126 transmits information Token AB generated by the encrypting unit 125 and the random number RC generated by the generating unit 127 to the information processing device 141. Specifically, the information Token AB calculated by Formula 19 and the random number RC generated in step S2122 are transmitted from the antenna unit 121 to the information processing device 141.

In step S2103, the receiving unit 152 of the information processing device 141 receives, via the antenna unit 151, the information Token AB and the random number RC transmitted from the information processing device 111. In step S2104, the generating unit 157 generates the key KAB. The key KAB is a secret key same as the key KAB generated by the information processing device 111 in step S2122. The key KAB is kept in advance only by the regular information processing device 141.

In step S2105, the generating unit 158 calculates the key KC from the random number RC and the key KAB according to the following formula:

$$KC = f(RC, KAB) \qquad \text{Formula 20}$$

The random number RC is received from the information processing device 111 in step S2103. The key KAB is generated in step S2104.

In step S2106, the decrypting unit 153 as the authentication-information generating unit performs processing for generating authentication information for performing authentication determination in the next step S2107. Specifically, in this unidirectional authentication processing, the decrypting unit 153 decrypts the information Token AB, which is received from the information processing device 111 in step S2103, with the key KC. As explained above, the information Token AB is information obtained by the information processing device 111 encrypting the random number RB with the key KC in step S2124. Therefore, according to the decryption processing, the random number RB is obtained as information for performing the authentication determination.

In step S2107, the authenticating unit 154 determines whether a decryption result and the random number RB coincide with each other. Specifically, the authenticating unit 154 compares the random number RB obtained by decrypting the information Token AB with the key KC in step S2106 and the random number RB generated in step S2101 and determines whether the random numbers RB coincide with each other.

When the information processing device 111 is a regular information processing device, the information processing device 111 keeps the correct fixed key KAB. Therefore, the key KC generated by the information processing device 111 causing the key KAB to act on the random number RB has the same value as the key KC generated by the information processing device 141 in step S2105. Therefore, in this case, the two random numbers RB coincide with each other. Therefore, in step S2109, the authenticating unit 154 executes authentication success processing for the information processing device 111.

On the other hand, when the information processing device 111 is an illegal information processing device, the information processing device 111 does not keep the correct key KAB. As a result, the two random numbers RB do not coincide with each other. Therefore, in this case, in step S2108, the authenticating unit 154 executes authentication failure processing for the information processing device 111.

In step S2102, the information processing device 141 supplies the same data to the information processing device 111 plural times. In step S2103, the information processing device 141 can obtain a processing result for the data. However, the processing result is calculated by the time variant key KC that changes every time. Therefore, in this unidirectional authentication processing, as in the authentication processing explained above, even if a large number of processing results are collected and analyzed by DFA attack using the illegal information processing device 141, it is difficult to specify a key that processes the data.

Bidirectional authentication processing of the second system is explained with reference to a flowchart of FIG. 17.

In step S2301, the generating unit 157 of the information processing device 141 generates the random number RB. In step S2302, the transmitting unit 156 transmits the random number RB to the information processing device 111.

In the information processing device 111, in step S2321, the receiving unit 122 receives the random number RB transmitted from the information processing device 141. In step S2322, the generating unit 127 generates the random numbers RA and RC and the key KAB. In step S2323, the generating unit 128 calculates the key KC from the random number RC and the key KAB, which are basic information serving as a basis of time variance of a time variant key. Specifically, the following formula is calculated to generate the key KC as a time variant key:

$$KC = f(RC, KAB) \qquad \text{Formula 21}$$

In step S2324, the encrypting unit 125 encrypts the random number RA and the random number RB with the key KC. Specifically, the encrypting unit 125 encrypts, according to the following formula, a combination (RA∥RB) of the random number RA generated in step S2322 and the random number RB received from the information processing device 141:

$$\text{Token } AB = eKC(RA\|RB) \qquad \text{Formula 22}$$

In step S2325, the transmitting unit 126 transmits the information Token AB and the random number RC to the information processing device 141. The information Token AB is a value indicated by Formula 22. The random number RC is a value generated in step S2322.

In the information processing device 141, in step S2303, the receiving unit 152 receives the information Token AB and the random number RC transmitted from the information processing device 111. In step S2304, the generating unit 157 generates the key KAB.

In step S2305, the generating unit 158 calculates the key KC from the random number RC and the key KAB. Specifically, the following formula is calculated to generate the key KC as a time variant key:

$$KC = f(RC, KAB) \qquad \text{Formula 23}$$

In step S2306, the decrypting unit 153 as the authentication-information generating unit performs processing for generating authentication information for performing authentication determination in the next step S2307. Specifically, in the case of this bidirectional authentication processing, the decrypting unit 153 decrypts the information Token AB, which is received from the information processing device 111 in step S2303, with the key KC. As explained above, the information Token AB is obtained by the information processing device 111 encrypting the combination (RA∥RB) of the random number RA and the random number RB with the key KC in step S2324. Therefore, the combination (RA∥RB) is obtained by this decryption processing.

In step S2307, the authenticating unit 154 determines whether a decryption result and the random number RB coincide with each other. However, in this case, only the random number RB of the combination (RA∥RB) obtained as the decryption result is extracted, set as a comparison target, and compared with the random number RB generated in step S2301 and transmitted to the information processing device 111 in step S2302. The extracted random number RA is used in processing in step S2310 explained later.

When the information processing device 111 is a regular information processing device, the information processing device 111 keeps the correct fixed key KAB. Therefore, the key KC generated by the information processing device 111 causing the random number RB to act on the key KAB has the same value as the key KC generated by the information processing device 141 in step S2305. Therefore, in this case, the two random numbers RB coincide with each other.

However, when the information processing device 111 is an illegal information processing device, the information processing device 111 does not keep the correct key KAB. As a result, the two random numbers RB do not coincide with each other. Therefore, in this case, in step S2308, the authenticating unit 154 executes authentication failure processing for the information processing device 111.

When the two random numbers RB coincide with each other, in step S2309, the authenticating unit 154 executes authentication success processing for the information processing device 111. In this way, the information processing device 141 authenticates the information processing device 111.

In step S2302, the information processing device 141 supplies the same data to the information processing device 111 plural times. In step S2303, the information processing device 141 can obtain a processing result for the data. However, the processing result is calculated by the time variant key KC that changes every time. Therefore, even if a large number of processing results are collected and analyzed by DFA attack using the illegal information processing device 141, it is difficult to specify a key that processes the data.

In order to further cause the information processing device 111 to authenticate the information processing device 141, processing explained below is executed.

In step S2310, the encrypting unit 155 encrypts the random number RB and the random number RA with the key KC. Specifically, the encrypting unit 155 encrypts, according to the following formula, a combination (RB∥RA) of the random number RB transmitted to the information processing device 111 in step S2302 and the random number RA received from the information processing device 111.

$$\text{Token } BA = eKC(RB\|RA) \quad \text{Formula 24}$$

Token AB obtained by encrypting the combination (RA∥RB) of the random number RA and the random number RB with the key KC according to Formula 22 in step S2324 and Token BA obtained by encrypting the combination (RB∥RA) of the random number RB and the random number RA with the key KC according to Formula 24 in step S2310 have different values because the order of combining the random number RA and the random number RB is different.

In step S2311, the transmitting unit 156 transmits the information Token BA calculated by Formula 24 to the information processing device 111.

In the information processing device 111, in step S2326, the receiving unit 122 receives the information Token BA transmitted from the information processing device 141. In step S2327, the decrypting unit 123 as the authentication-information generating unit performs processing for generating authentication information for performing authentication determination in the next step S2328. Specifically, in the case of this bidirectional authentication processing, the decrypting unit 123 decrypts the information Token BA, which is received from the information processing device 141 in step S2326, with the key KC. As explained above, the information Token BA is obtained by the information processing device 141 encrypting the combination (RB∥RA) of the random number RB and the random number RA with the key KC in step S2310. Therefore, the combination (RB∥RA) is obtained from this decryption processing.

In step S2328, the authenticating unit 124 determines whether a decryption result and the random numbers RA and RB coincide with each other. Specifically, in this case, both the random number RA and the random number RB are extracted from the combination (RB∥RA) obtained as the decryption result, set as comparison targets, and compared with values before encryption by Formula 22 of the random number RA and the random number RB included in the information Token AB and transmitted to the information processing device 141 in step S2325.

When the information processing device 141 is a regular information processing device, the information processing device 141 keeps the correct fixed key KAB. Therefore, the key KC generated by the information processing device 141 causing the random number RC to act on the key KAB has the same value as the key KC generated by the information processing device 111 in step S2323. Therefore, in this case, the two sets of random numbers RA and random numbers RB coincide with each other.

However, when the information processing device 141 is an illegal information processing device, the information processing device 141 does not keep the correct key KAB. As a result, the two sets of random numbers RA and random numbers RB do not coincide with each other. Therefore, in this case, in step S2329, the authenticating unit 124 executes authentication failure processing for the information processing device 141.

When the two sets of random numbers RA and random numbers RB coincide with each other, in step S2330, the authenticating unit 124 executes authentication success processing for the information processing device 141.

Figure 17:
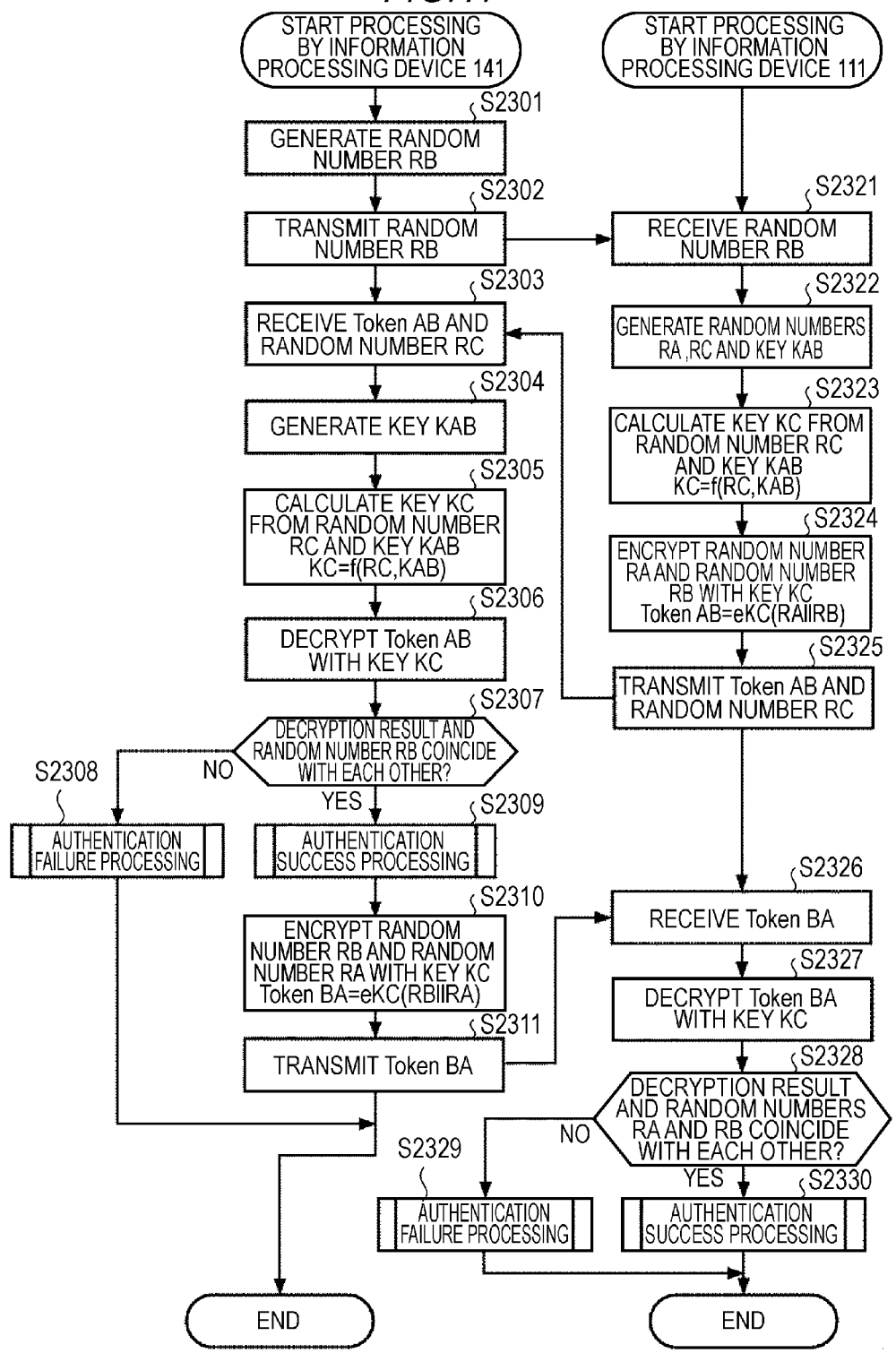
FIG. 17 is a flowchart for explaining bidirectional authentication processing of the second system according to the second embodiment.

In the bidirectional authentication processing shown in FIG. 17, in step S2328, the decryption result and the random numbers RA and RB are compared. However, it is also possible to directly compare the random numbers RA and the random numbers RB in the encrypted state. Bidirectional authentication processing in this case is shown in FIG. 18.

Figure 18:
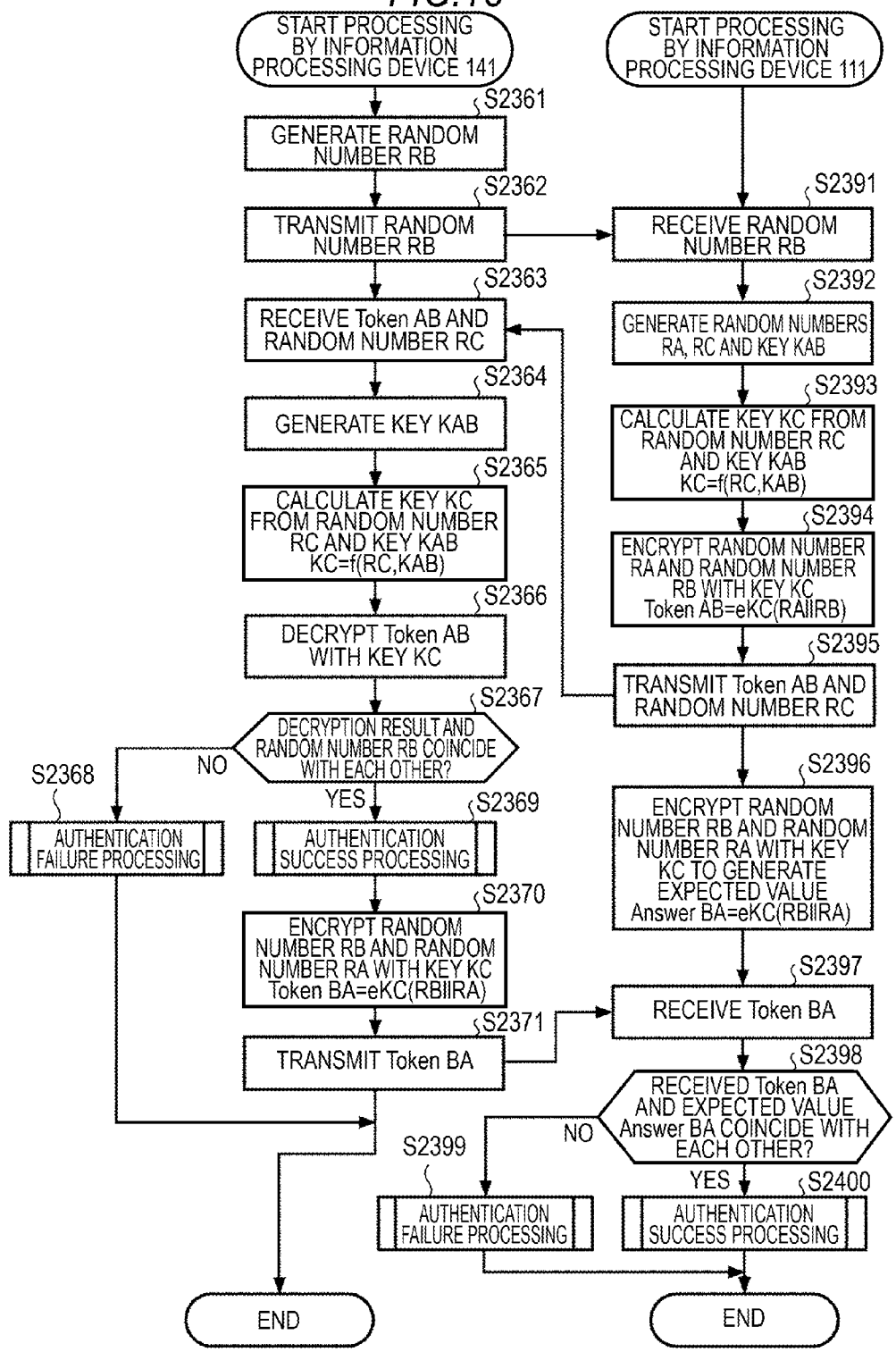
FIG. 18 is a flowchart for explaining bidirectional authentication processing of the second system according to the second embodiment.

Processing by the information processing device 141 in steps S2361 to S2371 in FIG. 18 is the same as the processing in steps S2301 to S2311 in FIG. 17. Processing by the information processing device 111 in steps S2391 to 2395 in FIG. 18 is the same as the processing in steps S2321 to S2325 in FIG. 17. Processing in steps S2396 to 2400 in FIG. 18 is different from the processing in steps S2326 to S2330 in FIG. 17.

Specifically, processing explained below is performed in the bidirectional authentication processing shown in FIG. 18. In the information processing device 111, in step S2396, the encrypting unit 125 as the authentication-information generating unit performs in advance processing for generating authentication information necessary for performing authentication processing in step S2398. Specifically, in the case of this bidirectional authentication processing, in step S2398, comparison with the information Token BA received from the information processing device 141 is performed. Therefore, the encrypting unit 125 encrypts the combination (RB∥RA) of the random number RB and the random number RA with the key KC to generate an expected value Answer BA according to the following formula:

$$\text{Answer } BA = eKC(RB\|RA) \quad \text{Formula 25}$$

In step S2397, the receiving unit 122 receives the information Token BA transmitted from the information processing device 141. The information Token BA is generated in step S2370 and obtained by encrypting the combination (RB∥RA) of the random number RB and the random number RA with the key KC.

In step S2398, the authenticating unit 124 determines whether the information Token BA received from the information processing device 141 in step S2397 and the expected value Answer BA generated in step S2396 coincide with each other.

When the information processing device 141 is a regular information processing device, the information processing device 141 keeps the correct fixed key KAB. Therefore, the key KC generated by the information processing device 141 causing the random number RC to act on the key KAB in step S2365 has the same value as the key KC generated by the information processing device 111 in step S2393. Therefore, in this case, the information Token BA and the expected value Answer BA coincide with each other.

However, when the information processing device 141 is an illegal information processing device, the information processing device 141 does not keep the correct key KAB. As a result, the information Token BA and the expected value Answer BA do not coincide with each other. Therefore, in this case, in step S2399, the authenticating unit 124 executes authentication failure processing for the information processing device 141.

When the information Token BA and the expected value Answer BA coincide with each other, in step S2400, the authenticating unit 124 executes authentication success processing for the information processing device 141.

In the bidirectional authentication processing shown in FIG. 17, in step S2307, the random number RB is set as the comparison target. In step S2328, the random number RA and the random number RB are set as the comparison targets. The comparison target(s) can also be a random number(s) as encrypted. Bidirectional authentication processing in this case is shown in FIG. 19.

Figure 19:
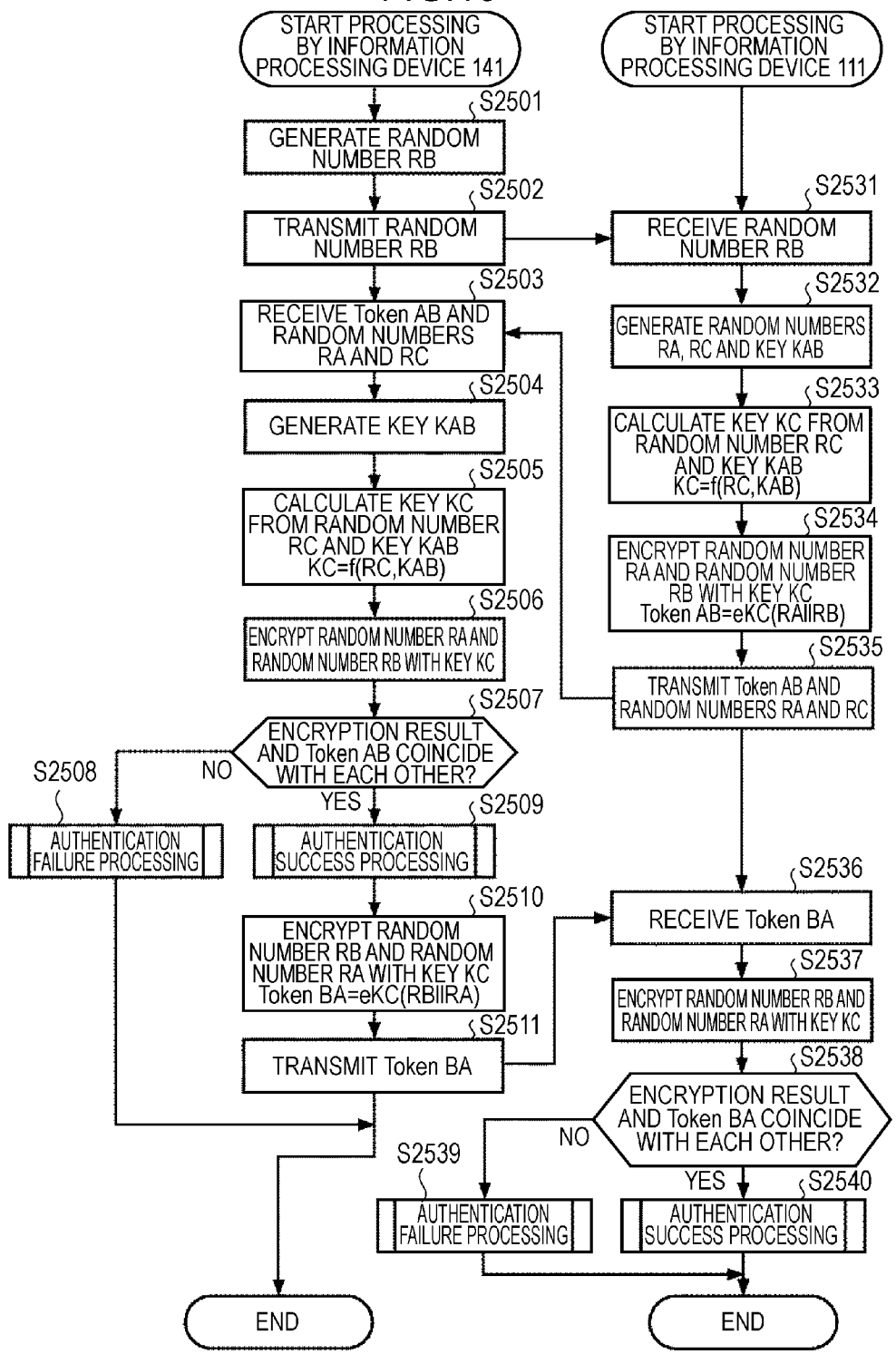
FIG. 19 is a flowchart for explaining bidirectional authentication processing of the second system according to the second embodiment.

Processing by the information processing device 141 in steps S2501 to S2511 in the bidirectional authentication processing shown in FIG. 19 is basically the same as the processing by the information processing device 141 in steps S2301 to S2311 in FIG. 17. However, processing in steps S2503, S2506, and S2507 in FIG. 19 is different from the processing in steps S2303, S2306, and S2307 in FIG. 17.

Processing by the information processing device 111 in steps S2531 to 2540 in FIG. 19 is basically the same as the processing by the information processing device 111 in steps S2321 to 2330 in FIG. 17. However, processing in steps S2535, S2537, and S538 in FIG. 19 is different from the processing in steps S2325, S2327, and S2328 in FIG. 17.

Specifically, in the case of the bidirectional authentication processing shown in FIG. 19, in step S2535, the transmitting unit 126 of the information processing device 111 transmits not only the information Token AB and the random number RC but also the random number RA. The information Token AB is generated by the encrypting unit 125 in step S2534 and is obtained by encrypting the combination (RA∥RB) of the random number RA and the random number RB with the key KC.

In the information processing device 141, in step S2503, the receiving unit 152 receives not only the information Token AB and the random number RC but also the random number RA. In step S2504, the generating unit 157 generates the key KAB. In step S2505, the generating unit 158 causes the random number RC to act on the key KAB to generate the key KC according to the following formula:

$$KC = f(RC, KAB) \quad \text{Formula 26}$$

In step S2506, the encrypting unit 155 as the authentication-information generating unit performs processing for generating authentication information necessary for performing authentication processing in step S2507. Specifically, in the case of this bidirectional authentication processing, in step S2507, comparison with the information Token AB received from the information processing device 111 is performed. Therefore, the encrypting unit 155 encrypts the combination (RA∥RB) of the random number RA and the random number RB with the key KC to generate the information Token AB. Specifically, the following formula is calculated:

$$\text{Token } AB = eKC(RA\|RB) \quad \text{Formula 27}$$

In step S2507, the authenticating unit 154 determines whether an encryption result obtained in step S2506 and the information Token AB received from the information processing device 111 in step S2503 coincide with each other. When the information Token AB calculated by Formula 27 and the information Token AB received from the information processing device 111 do not coincide with each other, in step S2508, the authenticating unit 154 executes authentication failure processing for the information processing device 111. On the other hand, when the information Token AB calculated by Formula 27 and the information Token AB received from the information processing device 111 coincide with each other, in step S2509, the authenticating unit 154 executes authentication success processing for the information processing device 111.

Further, in order to cause the information processing device 111 to authenticate the information processing device 141, in step S2510, the encrypting unit 155 encrypts the random number RB and the random number RA with the key KC. Specifically, the encrypting unit 155 encrypts, according to the following formula, the combination (RB∥RA) of the random number RB generated in step S2501 and the random number RA received from the information processing device 111:

$$\text{Token } BA = eKC(RB\|RA) \quad \text{Formula 28}$$

In step S2511, the transmitting unit 156 transmits the information Token BA calculated by Formula 28 to the information processing device 111.

In the information processing device 111, in step S2536, the receiving unit 122 receives the information Token BA transmitted from the information processing device 141. In step S2537, the encrypting unit 125 as the authentication-information generating unit performs processing for generating authentication information for performing authentication determination in the next step S2538. Specifically, in the case of this bidirectional authentication processing, the encrypting unit 125 performs processing for encrypting, with the key KC, the combination (RB∥RA) of the random number RB received from the information processing device 141 in step S2531 and the random number RA transmitted to the information processing device 141 in step S2535. Specifically, the following formula is calculated:

$$\text{Token } BA = eKC(RB\|RA) \quad \text{Formula 29}$$

In step S2538, the authenticating unit 124 determines whether an encryption result in step S2537 (i.e., information Token BA calculated according to Formula 29 in step S2537) and the information Token BA received from the information processing device 141 in step S2536 coincide with each other. When the two pieces of information Token BA do not coincide with each other, in step S2539, the authenticating unit 124 executes authentication failure processing for the information processing device 141.

When the two pieces of information Token BA coincide with each other, in step S2540, the authenticating unit 124 executes authentication success processing for the information processing device 141.

Since other processing is the same as that shown in FIG. 17, explanation of the processing is omitted.

In the bidirectional authentication processing shown in FIG. 19, after receiving the information Token BA from the information processing device 141 in step S2536, in step S2537, the encrypting unit 125 encrypts the random number RB and the random number RA with the key KC in step S2537. However, the random number RB and the random number RA can also be encrypted before the reception processing in step S2536. Bidirectional authentication processing in this case is shown in FIG. 20.

Figure 20:
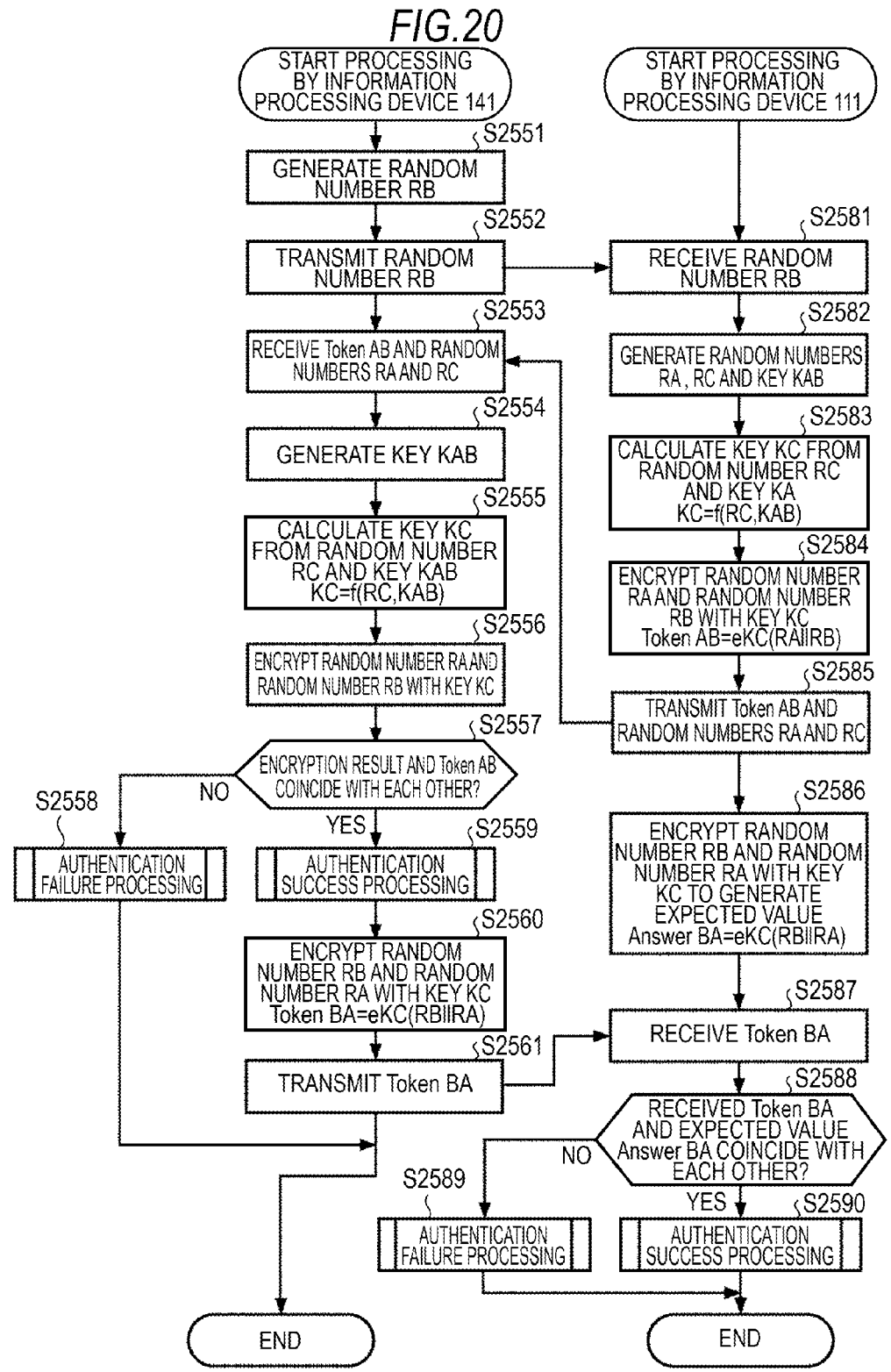
FIG. 20 is a flowchart for explaining bidirectional authentication processing of the second system according to the second embodiment.

In the bidirectional authentication processing shown in FIG. 20, processing by the information processing device 141 in steps S2551 to S2561 is the same as the processing by the information processing device 141 in steps S2501 to S2511 in FIG. 19. Processing by the information processing device 111 in steps S2581 to S2590 in FIG. 20 is basically the same as the processing by the information processing device 111 in steps S2531 to S2540 in FIG. 19. However, processing in step S2586 in FIG. 20 corresponding to the processing in step S2537 in FIG. 19 is performed before processing in step S2587 in FIG. 20 corresponding to the processing in step S2536 in FIG. 19.

Specifically, in the bidirectional authentication processing shown in FIG. 20, before the information Token BA transmitted from the information processing device 141 is received in step S2587, the encrypting unit 125 performs encryption processing according to the following formula in step S2586:

$$\text{Answer } BA = eKC(RB\|RA) \qquad \text{Formula 30}$$

In step S2588, the information Token BA received in step S2587 and Answer BA generated in step S2586 are compared. When the information Token BA and Answer BA do not coincide with each other, in step S2589, authentication failure processing for the information processing device 141 is performed. When the information Token BA and Answer BA coincide with each other, in step S2590, authentication success processing for the information processing device 141 is performed.

Other processing is the same as that shown in FIG. 19.

4. Third Embodiment

Bidirectional authentication processing of a third system according to a third embodiment is explained. In the bidirectional authentication processing of the third system, a random number used for authentication is transmitted, in an encrypted state, from an authenticating device to a device to be authenticated. In the authentication processing of the third system, two kinds of random numbers Ra and random numbers Rb and two kinds of fixed keys Ka and fixed keys Kb are used.

Figure 21:
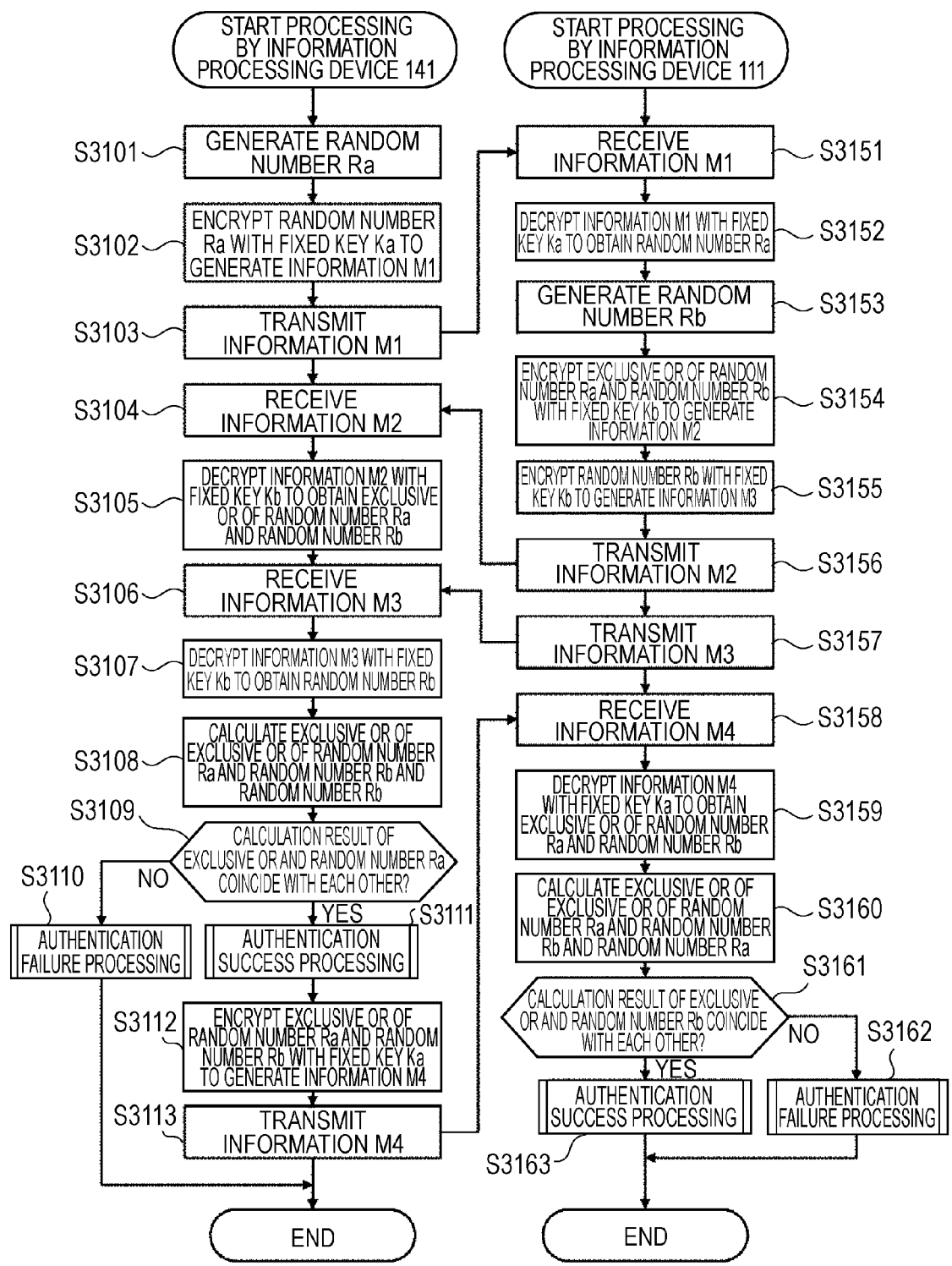
FIG. 21 is a flowchart for explaining bidirectional authentication processing of a third system according to a third embodiment.

FIG. 21 is a flowchart for explaining the bidirectional authentication processing of the third system.

In the information processing device 141, in step S3101, the generating unit 157 generates a random number Ra and a fixed key Ka. In step S3102, the encrypting unit 155 encrypts the random number Ra with the fixed key Ka to generate information M1. Specifically, the following formula is calculated:

$$M1 = eKa(Ra) \qquad \text{Formula 31}$$

In step S3103, the transmitting unit 156 transmits the information M1 to the information processing device 111. The information M1 is transmitted to the information processing device 111 via the antenna unit 151.

In the information processing device 111, in step S3151, the receiving unit 122 receives, via the antenna unit 121, the information M1 transmitted from the information processing device 141. In step S3152, the generating unit 127 generates the fixed key Ka and supplies the fixed key Ka to the decrypting unit 123. The decrypting unit 123 acquires the random number Ra by decrypting the information M1 with the fixed key Ka.

In step S3153, the generating unit 127 generates a random number Rb and a fixed key Kb. In step S3154, the encrypting unit 125 calculates exclusive OR (XOR) of the random number Ra and the random number Rb and encrypts a result of the calculation with the fixed key Kb to thereby generate information M2. Specifically, the following formula is calculated:

$$M2 = eKb(Ra\ XOR\ Rb) \qquad \text{Formula 32}$$

In step S3155, the encrypting unit 125 encrypts the random number Rb with the fixed key Kb to thereby generate information M3. Specifically, the following formula is calculated:

$$M3 = eKb(Rb) \qquad \text{Formula 33}$$

In step S3156, the transmitting unit 126 transmits the information M2 to the information processing device 141. The information M2 is transmitted to the information processing device 141 via the antenna unit 121. In step S3157, the transmitting unit 126 transmits the information M3 to the information processing device 141. The information M3 is transmitted to the information processing device 141 via the antenna unit 121.

The information M2 and the information M3 may be simultaneously transmitted to the information processing device 141.

In the information processing device 141, in step S3104, the receiving unit 152 receives, via the antenna unit 151, the information M2 transmitted from the information processing device 111. In step S3105, the generating unit 157 generates the key Kb and supplies the key Kb to the decrypting unit 153. The decrypting unit 153 decrypts the information M2 with the fixed key Kb to thereby acquire exclusive OR (Ra XOR Rb) of the random number Ra and the random number Rb and outputs the exclusive OR to the authenticating unit 154.

In step S3106, the receiving unit 152 receives, via the antenna unit 151, the information M3 transmitted from the information processing device 111. In step S3107, the decrypting unit 153 decrypts the information M3 with the fixed key Kb to thereby acquire the random number Rb and outputs the random number Rb to the authenticating unit 154.

In step S3108, the encrypting unit 155 calculates, according to the control by the authenticating unit 154, exclusive OR of the exclusive OR (Ra XOR Rb) of the random number Ra and the random number Rb and the random number Rb to thereby acquire the random number Ra. Specifically, the following formula is calculated.

$$Ra = (Ra\ XOR\ Rb)XOR\ Rb \qquad \text{Formula 34}$$

In step S3109, the authenticating unit 154 performs authentication according to consistency of the random numbers Ra. Specifically, the authenticating unit 154 determines whether the random number Ra generated in step S3101 and the random number Ra acquired in step S3108 coincide with each other. The fixed key Ka and the fixed key Kb are secret keys kept by only the regular information processing device 111. Therefore, when the information processing device 111 is a regular information processing device, the two random numbers Ra coincide with each other. Therefore, in this case, in step S3111, the authenticating unit 154 executes authentication success processing for the information processing device 111.

On the other hand, when the information processing device 111 is not a regular information processing device, the information processing device 111 does not keep the fixed key Ka and the fixed key Kb. Therefore, the two random numbers Ra do not coincide with each other. Therefore, in this case, in step S3110, the authenticating unit 154 executes authentication failure processing for the information processing device 111.

Further, in order to cause the information processing device 111 to authenticate the information processing device 141, processing explained below is executed.

In step S3112, the encrypting unit 155 encrypts, according to the control by the authenticating unit 154, the exclusive OR (Ra XOR Rb) of the random number Ra and the random number Rb with the fixed key Ka to thereby generate information M4. Specifically, the following formula is calculated:

$$M4 = eKa(Ra\ XOR\ Rb) \qquad \text{Formula 35}$$

In step S3113, the transmitting unit 156 transmits the information M4 to the information processing device 111. The information M4 is transmitted to the information processing device 111 via the antenna unit 151.

In the information processing device 111, in step S3158, the receiving unit 122 receives, via the antenna unit 121, the information M4 transmitted from the information processing device 141. In step S3159, the decrypting unit 123 decrypts the information M4 with the fixed key Ka to thereby acquire exclusive OR (Ra XOR Rb) of the random number Ra and the random number Rb and outputs the exclusive OR to the authenticating unit 124.

In step S3160, the encrypting unit 125 calculates, according to the control by the authenticating unit 124, exclusive OR of the exclusive OR (Ra XOR Rb) of the random number Ra and the random number Rb and the random number Ra to thereby acquire the random number Rb. Specifically, the following formula is calculated:

$$Rb=(Ra\ XOR\ Rb)XOR\ Ra \qquad \text{Formula 36}$$

In step S3161, the authenticating unit 124 performs authentication according to consistency of the random numbers Rb. Specifically, in step S3153, the authenticating unit 124 determines whether the random number Rb generated in step S3153 and the random number Rb acquired in step S3160 coincide with each other. The fixed key Ka and the fixed key Kb are secret keys kept by only the regular information processing device 141. Therefore, the information processing device 141 is a regular information processing device, the two random numbers Rb coincide with each other. Therefore, in this case, in step S3163, the authenticating unit 124 executes authentication success processing for the information processing device 141.

On the other hand, when the information processing device 141 is not a regular information processing device, the information processing device 141 does not keep the fixed key Ka and the fixed key Kb. Therefore, the two random numbers Rb do not coincide with each other. Therefore, in this case, in step S3162, the authenticating unit 124 executes authentication failure processing for the information processing device 141. As explained above, the information processing device 111 also authenticates the information processing device 141.

With the bidirectional authentication processing of the third system explained above, since the secret keys (the fixed keys Ka and Kb) kept in advance are used for encryption and decryption, it is unnecessary to generate a time variant key. Each of the information processing device 111 and the information processing device 141 only has to generate random numbers once.

Even if the same information M1 is supplied to the information processing device 111 plural times and the information M2 as a result of processing for the information M1 is obtained plural times for the purpose of hacking, the information M2 as the processing result is calculated by using the random number Rb that changes every time. Therefore, even if a large number of processing results are collected and analyzed by DFA attack, it is difficult to specify a key that processes the data. In other words, the data can be protected from the DFA attack.

In the bidirectional authentication processing shown in FIG. 21, in step S3154, the information M2 is generated by encrypting a calculation value of the exclusive OR using the fixed key Kb. In step S3105, the calculation value of the exclusive OR is acquired by decrypting the information M2 with the fixed key Kb. In step S3155, the information M3 is generated by encrypting the random number Rb using the fixed key Kb. In step S3107, the random number Rb is acquired by decrypting the information M3 with the fixed key Kb. As a relation between the encryption and the decryption, the encryption and the decryption can be interchanged. Bidirectional authentication processing in this case is shown in FIG. 22.

Figure 22:
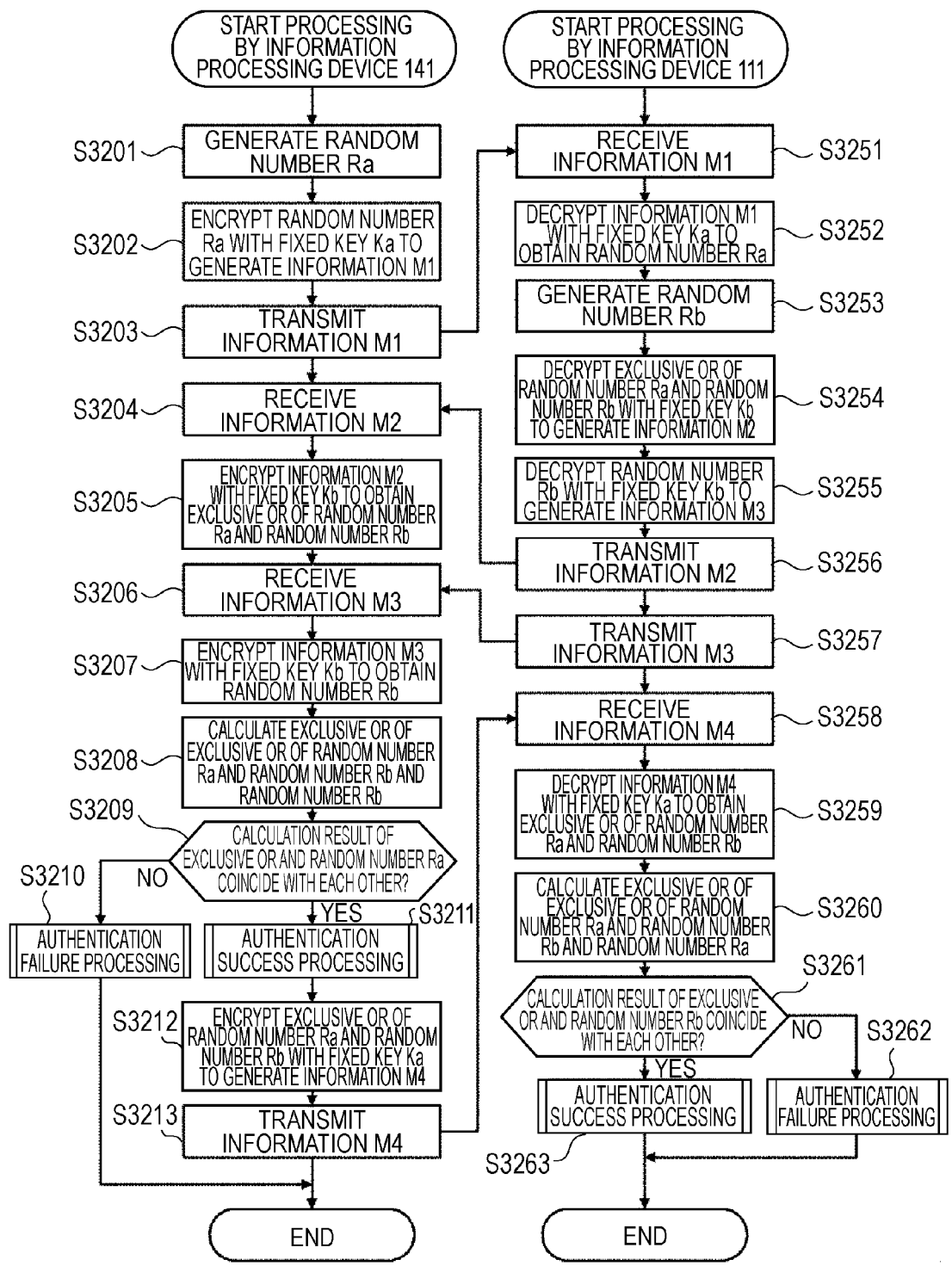
FIG. 22 is a flowchart for explaining a modification of the bidirectional authentication processing of the third system shown in FIG. 21.

In the bidirectional authentication processing shown in FIG. 22, processing by the information processing device 141 in steps S3201 to S3213 is basically the same as the processing by the information processing device 141 in steps S3101 to S3113 in FIG. 21. However, processing in steps S3205 and S3207 in FIG. 22 is different from the processing in steps S3105 and S3107 in FIG. 21.

Processing by the information processing device 111 in steps S3251 to S3263 in FIG. 22 is basically the same as the processing by the information processing device 111 in steps S3151 to S3163 in FIG. 21. However, processing in steps S3254 and S3255 in FIG. 22 is different from the processing in steps S3154 and S3155 in FIG. 21.

Specifically, in the bidirectional authentication processing shown in FIG. 22, in the information processing device 111, in step S3254, the encrypting unit 125 calculates exclusive OR (XOR) of the random number Ra and the random number Rb. The decrypting unit 123 decrypts a result of the calculation using the fixed key Kb to thereby generate the information M2. Specifically, the following formula is calculated. In the formula, for example, dK(A) indicates that a value A is decrypted by a key K.

$$M2=dKb(Ra\ XOR\ Rb) \qquad \text{Formula 37}$$

In step S3155, the decrypting unit 123 decrypts the random number Rb using the fixed key Kb to thereby generate the information M3. Specifically, the following formula is calculated:

$$M3=dKb(Rb) \qquad \text{Formula 38}$$

In the information processing device 141, in step S3205, the generating unit 157 generates the key Kb and supplies the key Kb to the encrypting unit 155. The encrypting unit 155 encrypts the information M2 with the fixed key Kb to thereby acquire exclusive OR (Ra XOR Rb) of the random number Ra and the random number Rb and outputs the exclusive OR to the authenticating unit 154.

In step S3207, the encrypting unit 155 encrypts the information M3 with the fixed key Kb to thereby acquire the random number Rb and outputs the random number Rb to the authenticating unit 154.

Other processing is the same as that shown in FIG. 21.

5. Fourth Embodiment

Bidirectional authentication processing of a fourth system according to a fourth embodiment is explained. In the bidirectional authentication processing of the fourth system, a random number used for authentication is transmitted, in an encrypted state, from an authenticating device to a device to be authenticated. In the bidirectional authentication processing of the fourth system, two kinds of random numbers Ra and random numbers Rb and one kind of fixed key Ka are used. The generated random numbers Ra and Rb are used as an encryption key and a decryption key, respectively.

Figure 23:
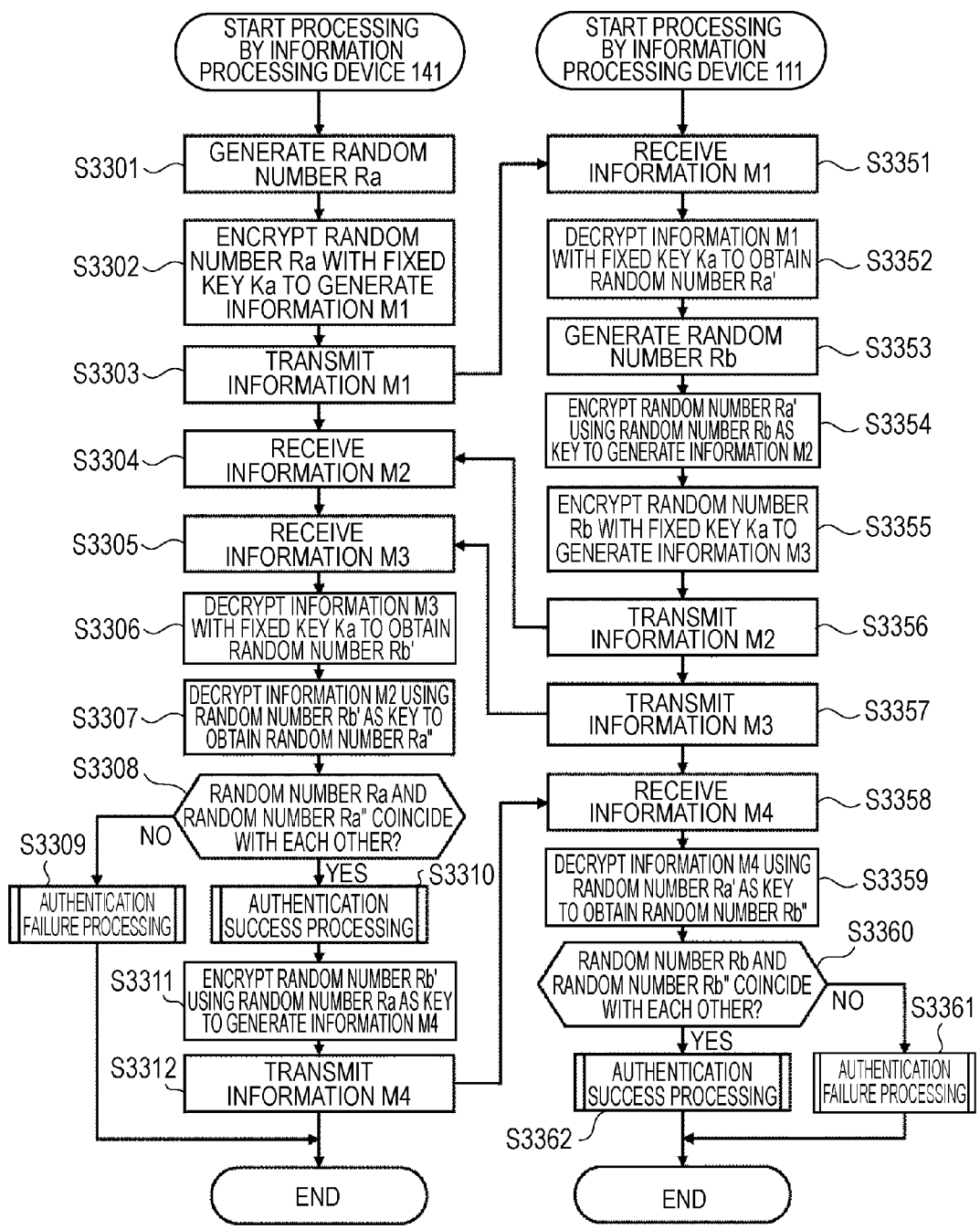
FIG. 23 is a flowchart for explaining bidirectional authentication processing of a fourth system according to a fourth embodiment.

FIG. 23 is a flowchart for explaining the bidirectional authentication processing of the fourth system.

In the information processing device 141, in step S3301, the generating unit 157 generates the random number Ra and the fixed key Ka. In step S3302, the encrypting unit 155 encrypts the random number Ra with the fixed key Ka to generate the information M1 according to the following formula:

$$M1=eKa(Ra) \qquad \text{Formula 39}$$

In step S3303, the transmitting unit 156 transmits the information M1 to the information processing device 111. The information M1 is transmitted to the information processing device 111 via the antenna unit 151.

In the information processing device 111, in step S3351, the receiving unit 122 receives, via the antenna unit 121, the information M1 transmitted from the information processing device 141. In step S3352, the generating unit 127 generates the fixed key Ka and supplies the fixed key Ka to the decrypting unit 123. The decrypting unit 123 decrypts the information M1 with the fixed key Ka to thereby acquire a random number Ra'. If the fixed key Ka used in this decryption is the same as the fixed key Ka used during the encryption, the random number Ra' same as the random number Ra is obtained.

In step S3353, the generating unit 127 generates the random number Rb. In step S3354, the encrypting unit 125 encrypts the random number Ra' using the random number Rb as a key to thereby generate the information M2. Specifically, the following formula is calculated:

$$M2=eRb(Ra') \qquad \text{Formula 40}$$

In step S3355, the encrypting unit 125 encrypts the random number Rb with the fixed key Ka to thereby generate the information M3. Specifically, the following formula is calculated:

$$M3=eKa(Rb) \qquad \text{Formula 41}$$

In step S3356, the transmitting unit 126 transmits the information M2 to the information processing device 141. The information M2 is transmitted to the information processing device 141 via the antenna unit 121.

In step S3357, the transmitting unit 126 transmits the information M3 to the information processing device 141. The information M3 is transmitted to the information processing device 141 via the antenna unit 121. The information M2 and the information M3 may be simultaneously transmitted to the information processing device 141.

In the information processing device 141, in step S3304, the receiving unit 152 receives, via the antenna unit 151, the information M2 transmitted from the information processing device 111. In step S3005, the receiving unit 152 receives, via the antenna unit 151, the information M3 transmitted from the information processing device 111.

In step S3306, the decrypting unit 153 decrypts the information M3 with the fixed key Ka to thereby acquire a random number Rb'. If the fixed key Ka used in this decryption is the same as the fixed key Ka used during the encryption, the random number Rb' same as the random number Rb is obtained.

In step S3307, the decrypting unit 153 decrypts the information M2 using the random number Rb' as a key and outputs a random number Ra" obtained as a result of the decryption to the authenticating unit 154.

In step S3108, the authenticating unit 154 performs authentication according to consistency of the random numbers Ra. Specifically, the authenticating unit 154 determines whether the random number Ra generated in step S3301 and the random number Ra" acquired in step S3107 coincide with each other. The fixed key Ka is a secret key kept by only the regular information processing device 111. Therefore, when the information processing device 111 is a regular information processing device, the random number Ra and the random number Ra" coincide with each other. Therefore, in this case, in step S3310, the authenticating unit 154 executes authentication success processing for the information processing device 111.

On the other hand, when the information processing device 111 is not a regular information processing device, the information processing device 111 does not keep the correct fixed key Ka. Therefore, the random number Ra and the random number Ra" do not coincide with each other. Therefore, in this case, in step S3309, the authenticating unit 154 executes authentication failure processing for the information processing device 111.

Further, in order to cause the information processing device 111 to authenticate the information processing device 141, processing explained below is executed.

In step S3111, the encrypting unit 155 encrypts, according to the control by the authenticating unit 154, the random number Rb' using the random number Ra as a key to thereby generate the information M4. Specifically, the following formula is calculated:

$$M4=eRa(Rb') \qquad \text{Formula 42}$$

In step S3112, the transmitting unit 156 transmits the information M4 to the information processing device 111. The information M4 is transmitted to the information processing device 111 via the antenna unit 151.

In the information processing device 111, in step S3358, the receiving unit 122 receives, via the antenna unit 121, the information M4 transmitted from the information processing device 141. In step S3359, the decrypting unit 123 decrypts the information M4 using the random number Ra' as a key and outputs a random number Rb" obtained as a result of the decryption to the authenticating unit 124.

In step S3360, the authenticating unit 124 performs authentication according to consistency of the random numbers Rb. Specifically, the authenticating unit 124 determines whether the random number Rb generated in step S3353 and the random number Rb" acquired in step S3359 coincide with each other. The fixed key Ka is a secret key kept by only the regular information processing device 141. Therefore, when the information processing device 141 is a regular information processing device, the random number Rb and the random number Rb" coincide with each other. Therefore, in this case, in step S3362, the authenticating unit 124 executes authentication success processing for the information processing device 141.

On the other hand, when the information processing device 141 is not a regular information processing device, the information processing device 141 does not keep the fixed key Ka. Therefore, the random number Rb and the random number Rb" do not coincide with each other. Therefore, in this case, in step S3361, the authenticating unit 124 executes authentication failure processing for the information processing device 141. As explained above, the information processing device 111 also authenticates the information processing device 141.

With the bidirectional authentication processing of the fourth system explained above, the information processing device 111 and the information processing device 141 only have to keep one secret key (fixed key Ka) in advance. Each of the information processing device 111 and the information processing device 141 only has to generate a random number once.

Even if the same information M1 is supplied to the information processing device 111 plural times and the information M2 as a result of processing for the information M1 is obtained plural times for the purpose of hacking, the information M2 as the processing result is encrypted by using, as a key, the random number Rb that changes every time. Therefore, even if a large number of processing results are collected and analyzed by DFA attack, it is difficult to specify a key that processes the data. In other words, the data can be protected from the DFA attack.

In the bidirectional authentication processing shown in FIG. 23, in step S3302, in step S3302, the information M1 is generated by encryption using the fixed key Ka. In step S3352, the information M1 is decrypted by the fixed key Ka. In step S3311, the information M4 is generated by encryption using the random number Rb as a key. In step S3359, the information M4 is decrypted by using the random number Ra' as a key. As a relation between the encryption and the decryption, the encryption and the decryption can be interchanged. Bidirectional authentication processing in this case is shown in FIG. 24.

Figure 24:
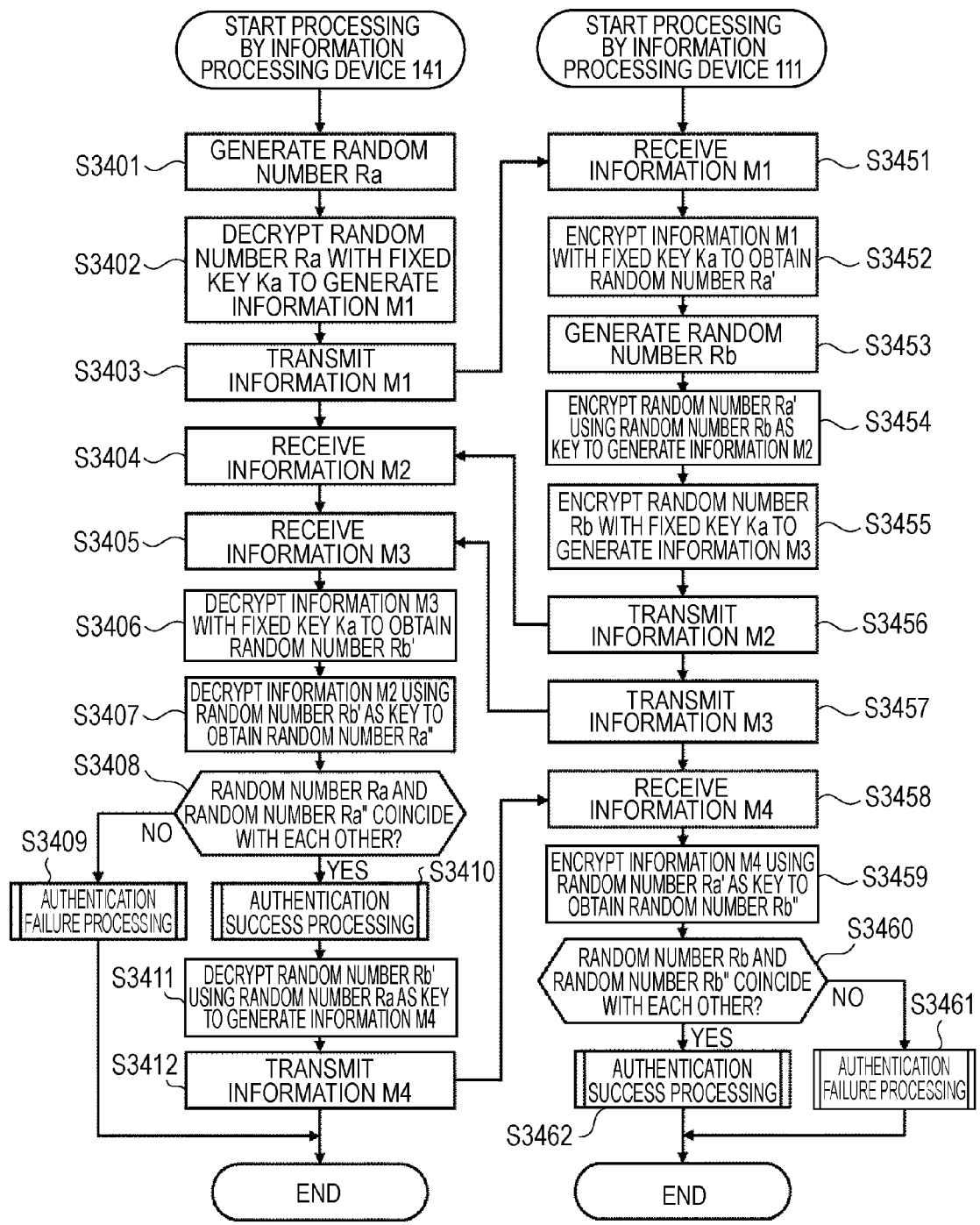
FIG. 24 is a flowchart for explaining a modification of the bidirectional authentication processing of the fourth system shown in FIG. 23.

In the bidirectional authentication processing shown in FIG. 24, processing by the information processing device 141 in steps S3401 to S3412 is basically the same as the processing by the information processing device 141 in steps S3301 to S3312 in FIG. 23. However, processing in steps S3402 and S3411 in FIG. 24 is different from the processing in steps S3302 and S3311 in FIG. 23.

Processing by the information processing device 111 in steps S3451 to S3462 in FIG. 24 is basically the same as the processing by the information processing device 111 in steps S3351 to S3362 in FIG. 22. However, processing in steps S3452 and S3459 in FIG. 24 is different from the processing in steps S3352 and S3359 in FIG. 23.

In the case of the bidirectional authentication processing shown in FIG. 24, in the information processing device 141, in step S3402, the decrypting unit 153 decrypts the random number Ra with the fixed key Ka to thereby generate the information M1. Specifically, the following formula is calculated:

$$M1 = dKa(Ra) \qquad \text{Formula 43}$$

In step S3411, the decrypting unit 153 decrypts the random number Rb' using the random number Ra to thereby generate the information M4. Specifically, the following formula is calculated.

$$M4 = dRa(Rb') \qquad \text{Formula 44}$$

In the information processing device 111, in step S3452, the generating unit 127 generates the fixed key Ka and supplies the fixed key Ka to the encrypting unit 125. The encrypting unit 125 encrypts the information M1 with the fixed key Ka to thereby acquire the random number Ra'.

In step S3459, the encrypting unit 125 encrypts the information M4 with the random number Ra' to thereby acquire the random number Rb".

Other processing is the same as that shown in FIG. 23.

6. Fifth Embodiment

Bidirectional authentication processing of a fifth system according to a fifth embodiment is explained. In the bidirectional authentication processing of the fifth system, a random number used for authentication is transmitted, in an encrypted state, from an authenticating device to a device to be authenticated. In the bidirectional authentication processing of the fifth system, two kinds of random numbers Ra and random numbers Rb and one kind of fixed key Ka are used. The generated random numbers Ra and Rb are used as an encryption key and a decryption key, respectively. Further, conversion processing $F_R(X)$ and inverse conversion processing $F^{-1}_R(X)$ employing a random number R are used.

Figure 25:
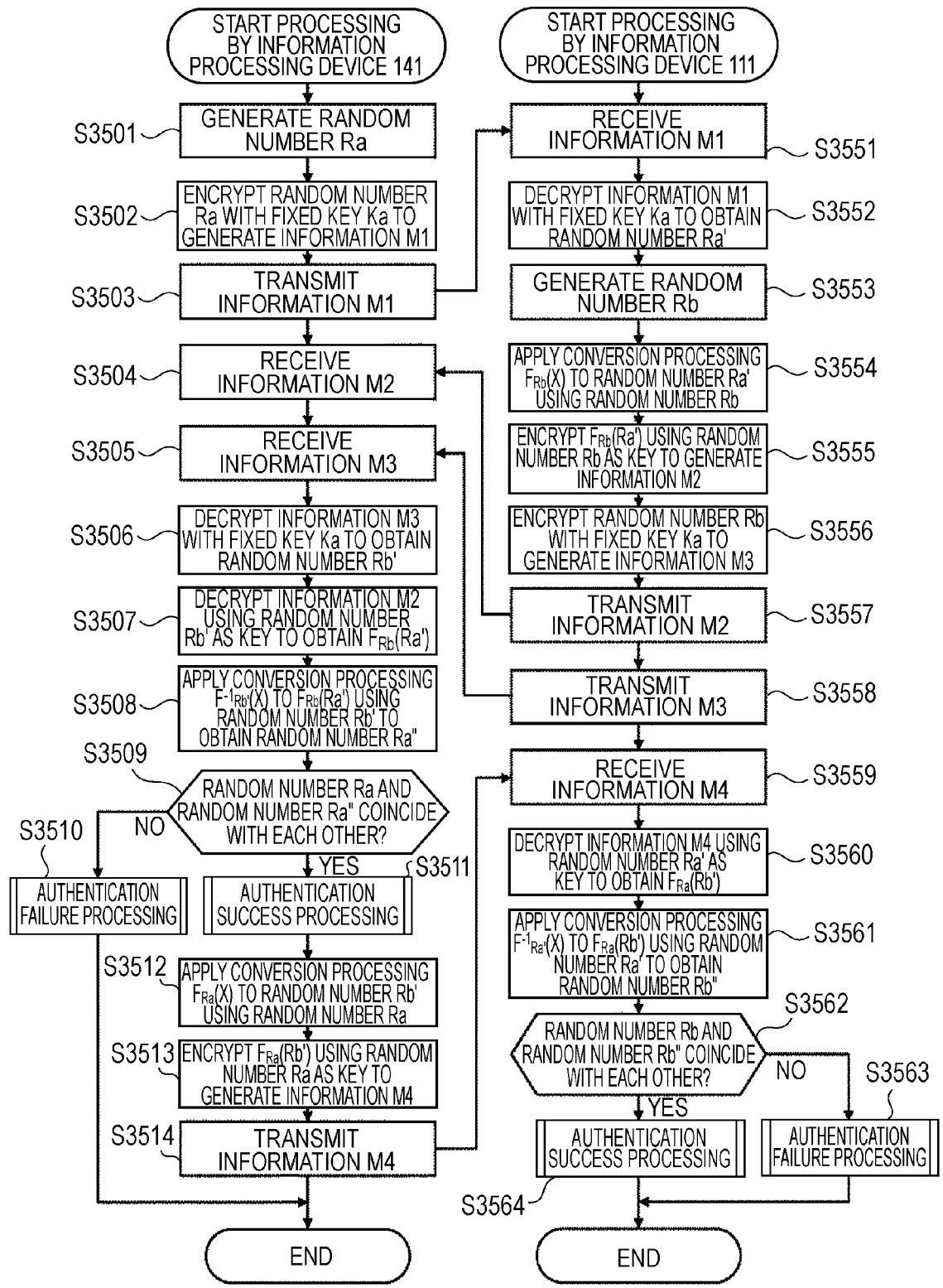
FIG. 25 is a flowchart for explaining bidirectional authentication processing of a fifth system according to a fifth embodiment.

FIG. 25 is a flowchart for explaining the bidirectional authentication processing of the fifth system.

In the information processing device 141, in step S3501, the generating unit 157 generates the random number Ra and the fixed key Ka. In step S3502, the encrypting unit 155 encrypts the random number Ra with the fixed key Ka to generate the information M1 according to the following formula:

$$M1 = eKa(Ra) \qquad \text{Formula 45}$$

In step S3503, the transmitting unit 156 transmits the information M1 to the information processing device 111. The information M1 is transmitted to the information processing device 111 via the antenna unit 151.

In the information processing device 111, in step S3551, the receiving unit 122 receives, via the antenna unit 121, the information M1 transmitted from the information processing device 141. In step S3552, the generating unit 127 generates the fixed key Ka and supplies the fixed key Ka to the decrypting unit 123. The decrypting unit 123 decrypts the information M1 with the fixed key Ka to thereby acquire the random number Ra'. If the fixed key Ka used in this decryption is the same as the fixed key Ka used during the encryption, the random number Ra' same as the random number Ra is obtained.

In step S3553, the generating unit 127 generates the random number Rb. In step S3554, the encrypting unit 125 applies conversion processing $F_{Rb}(X)$ employing the random number Rb to the random number Ra'. Further, in step S3554, the encrypting unit 125 encrypts a conversion processing result $F_{Rb}(Ra')$ using the random number Rb as a key to thereby generate the information M2. Specifically, the following formula is calculated:

$$M2 = eRb(F_{Rb}(Ra')) \qquad \text{Formula 46}$$

In step S3556, the encrypting unit 125 encrypts the random number Rb with the fixed key Ka to thereby generate the information M3. Specifically, the following formula is calculated.

$$M3 = eKa(Rb) \qquad \text{Formula 47}$$

In step S3557, the transmitting unit 126 transmits the information M2 to the information processing device 141. The information M2 is transmitted to the information processing device 141 via the antenna unit 121.

In step S3558, the transmitting unit 126 transmits the information M3 to the information processing device 141. The information M3 is transmitted to the information processing device 141 via the antenna unit 121. The information M2 and the information M3 may be simultaneously transmitted to the information processing device 141.

In the information processing device 141, in step S3504, the receiving unit 152 receives, via the antenna unit 151, the information M2 transmitted from the information processing device 111. In step S3505, the receiving unit 152 receives, via the antenna unit 151, the information M3 transmitted from the information processing device 111.

In step S3506, the decrypting unit 153 decrypts the information M3 with the fixed key Ka to thereby acquire the random number Rb'. If the fixed key Ka used in this decryption is the same as the fixed key Ka used during the encryption, the random number Rb' same as the random number Rb is obtained.

In step S3507, the decrypting unit 153 decrypts the information M2 using the random number Rb' as a key to thereby acquire the conversion processing result $F_{Rb}(Ra')$ and supplies the conversion processing result $F_{Rb}(Ra')$ to the authenticating unit 154. In step S3508, the encrypting unit 155 applies, according to the control by the authenticating unit 154, the inverse conversion processing $F^{-1}_{Rb}(X)$ employing the random number Rb' to the conversion processing result $F_{Rb}(Ra')$ and outputs the random number Ra" obtained as a result of the inverse conversion processing $F^{-1}_{Rb}(X)$ to the authenticating unit 154.

In step S3509, the authenticating unit 154 performs authentication according to consistency of the random numbers Ra. Specifically, the authenticating unit 154 determines whether the random number Ra generated in step S3501 and the random number Ra" acquired in step S3508 coincide with each other. The fixed key Ka is a secret key kept by only the regular information processing device 111. Therefore, when the information processing device 111 is a regular information processing device, the random number Ra and the random number Ra" coincide with each other. Therefore, in this case, in step S3511, the authenticating unit 154 executes authentication success processing for the information processing device 111.

On the other hand, when the information processing device 111 is not a regular information processing device, the information processing device 111 does not keep the correct fixed key Ka. Therefore, the random number Ra and the random number Ra" do not coincide with each other. Therefore, in this case, in step S3510, the authenticating unit 154 executes authentication failure processing for the information processing device 111.

Further, in order to cause the information processing device 111 to authenticate the information processing device 141, processing explained below is executed.

In step S3512, the encrypting unit 155 applies, according to the control by the authenticating unit 154, the conversion processing $F_{Ra}(X)$ employing the random number Ra to the random number Rb'. Further, in step S3513, the encrypting unit 155 encrypts a conversion processing result $F_{Ra}(Rb')$ using the random number Ra as a key to thereby generate the information M4. Specifically, the following formula is calculated:

$$M4=eRa(F_{Ra}(Rb'))$$  Formula 48

In step S3514, the transmitting unit 156 transmits the information M4 to the information processing device 111. The information M4 is transmitted to the information processing device 111 via the antenna unit 151.

In the information processing device 111, in step S3559, the receiving unit 122 receives, via the antenna unit 121, the information M4 transmitted from the information processing device 141. In step S3560, the decrypting unit 123 decrypts the information M4 using the random number Ra' as a key to thereby acquire the conversion processing result $F_{Ra}(Rb')$ and outputs the conversion processing result $F_{Ra}(Rb')$ to the authenticating unit 124.

In step S3561, the encrypting unit 125 applies, according to the control by the authenticating unit 124, inverse conversion processing $F^{-1}_{Ra}(X)$ employing the random number Ra' to the conversion processing result $F_{Ra}(Rb')$ and outputs the random number Rb" obtained as a result of the inverse conversion processing $F^{-1}_{Ra}(X)$ to the authenticating unit 124.

In step S3562, the authenticating unit 124 performs authentication according to consistency of the random numbers Rb. Specifically, the authenticating unit 124 determines whether the random number Rb generated in step S3553 and the random number Rb" acquired in step S3561 coincide with each other. The fixed key Ka is a secret key kept by only the regular information processing device 141. Therefore, when the information processing device 141 is a regular information processing device, the random number Rb and the random number Rb" coincide with each other. Therefore, in this case, in step S3364, the authenticating unit 124 executes authentication success processing for the information processing device 141.

On the other hand, when the information processing device 141 is not a regular information processing device, the information processing device 141 does not keep the fixed key Ka. Therefore, the random number Rb and the random number Rb" do not coincide with each other. Therefore, in this case, in step S3563, the authenticating unit 124 executes authentication failure processing for the information processing device 141. As explained above, the information processing device 111 also authenticates the information processing device 141.

With the bidirectional authentication processing of the fifth system explained above, the information processing device 111 and the information processing device 141 only have to keep one secret key (the fixed key Ka) in advance. Each of the information processing device 111 and the information processing device 141 only has to generate random numbers once.

Even if the same information M1 is supplied to the information processing device 111 plural times and the information M2 as a result of processing for the information M1 is obtained plural times for the purpose of hacking, the information M2 as the processing result is encrypted by using the random number Rb, which changes every time, as a key. Therefore, even if a large number of processing results are collected and analyzed by DFA attack, it is difficult to specify a key that processes the data. In other words, the data can be protected from the DFA attack.

The present application can also be applied to information processing devices other than the IC card and the reader writer.

The communication can be communication other than the near distance communication. The communication may be, rather than radio communication, not only wire communication but also communication in which the radio communication and the wire communication are mixed, i.e., communication in which the radio communication is performed in certain sections and the wire communication is performed in other sections. Further, communication from a certain device to other devices may be performed by the radio communication and communication from the other devices to the certain device may be performed by the radio communication.

The series of processing explained above can be executed by hardware or can be executed by software. When the series of processing is executed by software, a computer program constituting the software is installed from a program recording medium in a computer incorporated in dedicated hardware or, for example, a general-purpose personal computer that can execute various functions by installing various computer programs.

For example, a program recording medium that is installed in a computer and stores a computer program executable by the computer such as the storing unit 129 shown in FIG. 8 and the storing unit 159 shown in FIG. 9 includes a removable medium as a package medium including a magnetic disk (including a flexible disk), an optical disk (including a CD-ROM (Compact Disc-Read Only Memory) and a DVD (Digital Versatile Disc)), a magneto-optical disk, or a semiconductor memory, or a ROM or a hard disk in which a computer program is temporarily or permanently stored. The storage of the computer program in the program recording medium is performed by using a wire or radio communication medium such as a local area network, the Internet or a digital satellite broadcast via a communication unit as an interface such as a router or a modem according to necessity.

In this specification, the steps describing the computer program include not only processing performed in time series according to described order but also processing executed in parallel or individually, although not always processed in time series.

In this specification, the system represents an entire apparatus including plural devices.

Embodiments are not limited to the embodiments explained above. Various modifications are possible without departing from the spirit.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing device comprising:
   a receiving unit that receives a first random number from another information processing device;
   a generating unit that generates a second random number;
   a time variant key generating unit that causes the second random number to act on a fixed key to generate a time variant key;
   an encrypting unit that encrypts the first random number with the time variant key; and
   a transmitting unit that transmits the first random number encrypted by the time variant key and the second random number to the other information processing device.

2. An information processing device according to claim 1, wherein
   the receiving unit receives the first random number that is encrypted from the other information processing device;
   the generating unit generates a second fixed key; and
   the information processing device further includes a decrypting unit that decrypts, with the second fixed key, the encrypted first random number received from the other information processing device.

3. An information processing device according to claim 2, wherein
   the generating unit further generates a third random number,
   the encrypting unit further encrypts the third random number with the time variant key,
   the transmitting unit further transmits the encrypted third random number to the other information processing device,
   the receiving unit receives the third random number encrypted by the second fixed key from the other information processing device,
   the decrypting unit decrypts the encrypted third random number with the second fixed key, and
   the information processing device further includes:
   an authenticating unit that performs authentication according to the decrypted third random number.

4. An information processing device according to claim 2, wherein
   the generating unit further generates a third random number,
   the encrypting unit further encrypts the third random number with the time variant key,
   the transmitting unit further transmits the encrypted third random number to the other information processing device,
   the encrypting unit further encrypts the third random number with the second fixed key,
   the receiving unit receives the third random number encrypted by the second fixed key from the other information processing device, and
   the information processing device further includes an authenticating unit that performs authentication according to the encrypted third random number.

5. An information processing device according to claim 1, wherein
   the generating unit further generates a third random number,
   the encrypting unit encrypts a first combination of the third random number and the first random number with the time variant key,
   the transmitting unit transmits the encrypted first combination of the third random number and the first random number to the other information processing device,
   the receiving unit further receives a second combination of the first random number and the third random number encrypted by the time variant key from the other information processing device, and
   the information processing device further includes:
   a decrypting unit that decrypts, with the time variant key, the encrypted second combination of the first random number and the third random number received from the other information processing device; and
   an authenticating unit that performs authentication according to the decrypted third random number and the decrypted first random number.

6. An information processing device according to claim 1, wherein
   the generating unit further generates a third random number,
   the encrypting unit encrypts a first combination of the third random number and the first random number with the time variant key,
   the transmitting unit transmits the encrypted first combination of the third random number and the first random number to the other information processing device,
   the encrypting unit further encrypts a second combination of the first random number and the third random number with the time variant key,
   the receiving unit further receives the encrypted second combination of the first random number and the third random number from the other information processing device, and
   the information processing device further includes an authenticating unit that performs authentication according to the encrypted second combination of the first random number and the third random number.

7. An information processing device according to claim 6, wherein the encrypting unit encrypts, after the receiving unit receives the encrypted second combination of the first random number and the third random number from the other information processing device, the second combination of the first random number and the third random number with the time variant key.

8. An information processing device according to claim 1, wherein the information processing device is an IC card.

9. A non-transitory computer readable medium storing instructions for causing a computer to execute processing for:
   receiving a first random number from another information processing device;
   generating a second random number;
   generating a time variant key by causing the second random number to act on a fixed key to generate the time variant key;

encrypting the first random number with the time variant key; and transmitting the first random number encrypted by the time variant key and the second random number to the other information processing device.

10. An information processing device comprising:

a generating unit that generates a first random number;

a transmitting unit that transmits the first random number to another information processing device;

a receiving unit that receives the first random number encrypted by a first time variant key and a second random number from the other information processing device;

a time variant key generating unit that generates a second time variant key same as the first time variant key by causing the second random number to act on a fixed key to generate the second time variant key;

an authentication-information generating unit that generates authentication information for authenticating the other information processing device with the second time variant key; and an authenticating unit that authenticates the other information processing device according to the authentication information.

11. An information processing device according to claim 10, wherein the generating unit generates a second fixed key on which the second random number is caused to act; and the transmitting unit further transmits the first random number encrypted by the second fixed key.

12. An information processing device according to claim 11, wherein the receiving unit further receives a third random number encrypted by the first time variant key from the other information processing device;

the information processing device further includes:

a decrypting unit that decrypts, with the second time variant key, the third random number encrypted by the first time variant key; and an encrypting unit that encrypts, with the second fixed key, the third random number decrypted and obtained by the decrypting unit; and the transmitting unit further transmits the third random number encrypted by the second fixed key to the other information processing device.

13. An information processing device according to claim 10, wherein the receiving unit receives a first combination of a third random number and the first random number in an encrypted state, the authentication-information generating unit is a decrypting unit that decrypts the encrypted first combination of the third random number and the first random number with the second time variant key to generate the first random number as the authentication information, the information processing device further includes an encrypting unit that encrypts a second combination of the first random number and the third random number, and the transmitting unit further transmits the encrypted second combination of the first random number and the third random number to the other information processing device.

14. An information processing device according to claim 10, wherein the receiving unit receives a first combination of a third random number and the first random number in an encrypted state, the authentication-information generating unit is an encrypting unit that encrypts the first combination of the third random number and the first random number with the second time variant key to generate the authentication information, the encrypting unit further encrypts a second combination of the first random number and the third random number, and the transmitting unit further transmits the encrypted second combination of the first random number and the third random number to the other information processing device.

15. An information processing device according to claim 10, wherein the information processing device is a reader writer.

16. A non-transitory computer readable medium storing instructions for causing a computer to execute processing for:

generating a first random number;

transmitting the first random number to another information processing device;

receiving the first random number encrypted by a first time variant key and a second random number from the other information processing device;

generating a second time variant key same as the first time variant key by causing the second random number to act on a fixed key to generate the second time variant key;

generating authentication information for authenticating the other information processing device with the second time variant key; and authenticating the other information processing device according to the authentication information.

17. An information processing system, comprising:

a first information processing device configured to receive a random number from a second information processing device, generate a first time variant key based on a second random number and a fixed key, encrypt the random number with the first time variant key, and transmit the encrypted random number to the second information processing device together with the second random number as a basis of time variance of the first time variant key; and the second information processing device configured to generate a second time variant key same as the first time variant key according to the second random number, generate authentication information with the second time variant key, and authenticate the first information processing device according to the authentication information.

* * * * *